(12) United States Patent
Tanaka et al.

(10) Patent No.: US 9,592,576 B2
(45) Date of Patent: Mar. 14, 2017

(54) HEAT TRANSFER TUBE EXPANSION APPARATUS

(71) Applicant: DAIKIN INDUSTRIES, LTD., Osaka-shi, Osaka (JP)

(72) Inventors: Yoshikazu Tanaka, Sakai (JP); Takurou Katakami, Sakai (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 14/899,017

(22) PCT Filed: May 1, 2014

(86) PCT No.: PCT/JP2014/062065
§ 371 (c)(1),
(2) Date: Dec. 16, 2015

(87) PCT Pub. No.: WO2014/208197
PCT Pub. Date: Dec. 31, 2014

(65) Prior Publication Data
US 2016/0114440 A1 Apr. 28, 2016

(30) Foreign Application Priority Data

Jun. 28, 2013 (JP) .................................. 2013-136404

(51) Int. Cl.
*B23P 15/26* (2006.01)
*B21D 39/20* (2006.01)
(Continued)

(52) U.S. Cl.
CPC .............. *B23P 15/26* (2013.01); *B21D 39/20* (2013.01); *B21D 41/02* (2013.01); *B21D 53/085* (2013.01);
(Continued)

(58) Field of Classification Search
CPC ....... B23P 15/26; B21D 53/085; B21D 41/02; B21D 39/20; B21D 39/06; F28D 1/0475;
(Continued)

(56) References Cited

U.S. PATENT DOCUMENTS 5,210,932 A * 5/1993 Tokura ................. B21D 53/085
29/726
8,276,261 B2 * 10/2012 Baba ...................... B21D 39/06
29/270
(Continued)

FOREIGN PATENT DOCUMENTS

JP 4-113123 U 10/1992
JP 6-535 U 1/1994
(Continued)

OTHER PUBLICATIONS

International Preliminary Report of corresponding PCT Application No. PCT/JP2014/062065 dated Dec. 29, 2015.
(Continued)

Primary Examiner — Sarang Afzali
(74) Attorney, Agent, or Firm — Global IP Counselors

(57) ABSTRACT

A heat transfer tube fixing apparatus of a heat transfer tube expansion apparatus has grasping sections and a moving section. The grasping sections grasp one axial direction end sections of a plurality of heat transfer tubes in a state where the heat transfer tubes are inserted in a plurality of heat transfer fins. The moving section switches between a first state of covering the surroundings of the grasping sections and a second state of not covering the surroundings of the grasping sections by moving in the axial direction of the heat transfer tubes. The grasping sections fix the heat transfer tubes so as not to move in the axial direction and the heat
(Continued)

transfer fins and the heat transfer tubes are fixed by the heat transfer tubes expanding in a state where the moving section is in the first state.

8 Claims, 16 Drawing Sheets

(51) Int. Cl.
- *F28F 1/32* (2006.01)
- *B21D 41/02* (2006.01)
- *B21D 53/08* (2006.01)

(52) U.S. Cl.
CPC .......... *F28F 1/32* (2013.01); *F28F 2275/125* (2013.01); *Y10T 29/4938* (2015.01); *Y10T 29/4994* (2015.01); *Y10T 29/49368* (2015.01); *Y10T 29/49375* (2015.01); *Y10T 29/49391* (2015.01); *Y10T 29/53117* (2015.01); *Y10T 29/53122* (2015.01)

(58) Field of Classification Search
CPC . F28F 1/32; F28F 2275/125; Y10T 29/53122; Y10T 29/53117; Y10T 29/4994; Y10T 29/49368; Y10T 29/49378; Y10T 29/49375; Y10T 29/53113; Y10T 29/4938; Y10T 29/49391

See application file for complete search history.

(56) References Cited

U.S. PATENT DOCUMENTS

| | | |
|---|---|---|
| 2010/0263202 A1 | 10/2010 | Baba |
| 2012/0279695 A1 | 11/2012 | Tokura |
| 2014/0124184 A1 | 5/2014 | Tokura |

FOREIGN PATENT DOCUMENTS

| | | |
|---|---|---|
| JP | 2000-301271 A | 10/2000 |
| JP | 2010-247190 A | 11/2010 |
| JP | 2011-161515 A | 8/2011 |
| JP | 2013-39618 A | 2/2013 |

OTHER PUBLICATIONS

International Search Report of corresponding PCT Application No. PCT/JP2014/062065 dated Jul. 29, 2014.

European Search report of corresponding EP Application No. 14 81 8222.3 date Aug. 30, 2016.

* cited by examiner

HEAT TRANSFER TUBE EXPANSION APPARATUS

CROSS-REFERENCE TO RELATED APPLICATIONS

This U.S. National stage application claims priority under 35 U.S.C. §119(a) to Japanese Patent Application No. 2013-136404, filed in Japan on Jun. 28, 2013, the entire contents of which are hereby incorporated herein by reference.

TECHNICAL FIELD

The present invention relates to a heat transfer tube expansion apparatus and a heat transfer tube expansion method and particularly relates to a heat transfer tube expansion apparatus and a heat transfer tube expansion method where a plurality of heat transfer tubes expand in a state of being inserted in insertion holes in a plurality of heat transfer fins which are layered with spacing of a predetermined interval.

BACKGROUND ART

In the background art, there is a heat transfer tube expansion apparatus and a heat transfer tube expansion method where a plurality of heat transfer tubes expand in a state of being inserted in insertion holes in a plurality of heat transfer fins which are layered with spacing of a predetermined interval as shown in Japanese Unexamined Patent Application Publication No. 2011-161515. In the heat transfer tube expansion apparatus and the heat transfer tube expansion method, first, tube abutting members, which have a grasping section (a portion which abuts with the outer surface of the heat transfer tube) which is open with a radial formation, are arranged at one axial direction end sections of the heat transfer tubes, and portions of the heat transfer tubes expand with mandrels being inserted inside the heat transfer tubes from the one axial direction end section side of the heat transfer tubes to positions which correspond to the grasping sections in this state. Next, the grasping sections fix the heat transfer tubes so as not to move in the axial direction by guide cylinders, which are inserted around the outside of the tube abutting members, moving from the one axial direction end section side of the heat transfer tubes to in front of the grasping sections so as to close the grasping sections which are open with a radial formation. After this, the remaining portions of the heat transfer tubes expand with the mandrels being further inserted inside the heat transfer tubes.

SUMMARY

In the heat transfer tube expansion apparatus and the heat transfer tube expansion method in the background art described above, it is possible to also be applied to a case where the intervals between the heat transfer tubes are narrow since it is possible to fix the heat transfer tubes not to move in the axial direction using the tube abutting members and the guide cylinders.

However, in the heat transfer tube expansion apparatus and the heat transfer tube expansion method in the background art described above, there is a concern that it is easy for variation to occur in the force with which the heat transfer tubes are grasped by the grasping sections since the guide cylinders move to only in front of the grasping sections and that it is not possible to perform precise tube expansion. In addition, the axial direction length of portions, which are grasped by the grasping sections out of the one axial direction end sections of the heat transfer tubes, becomes longer since it is not possible for the force with which the heat transfer tubes are grasped to be large. In addition, it is not possible to perform smooth tube expansion since the tube expansion process is divided into two steps with a guide cylinder moving process in-between. In addition, even though moving of the guide cylinders which number as many as the number of the heat transfer tubes is necessary at this time, it is difficult to provide the plurality of guide cylinders to correspond to the plurality of heat transfer tubes in a case where the intervals between the heat transfer tubes are extremely narrow or a case where the intervals between the heat transfer tubes are an unequal pitch where the intervals are not equal.

The problem of the present invention is to provide a heat transfer tube expansion apparatus and a heat transfer tube expansion method where it is possible to apply to a case where the intervals between heat transfer tubes are narrow and it is possible to smoothly perform precise tube expansion by suppressing variation in the force with which the heat transfer tubes are grasped.

A heat transfer tube expansion apparatus according to a first aspect has a heat transfer tube fixing apparatus and a mandrel apparatus. The heat transfer tube fixing apparatus has grasping sections and a moving section. The grasping sections grasp one axial direction end sections of a plurality of heat transfer tubes in a state where the heat transfer tubes are inserted in insertion holes in a plurality of heat transfer fins which are layered with spacing of a predetermined interval. The moving section switches between a first state of covering the surroundings of the grasping sections and a second state of not covering the surroundings of the grasping sections by moving in the axial direction of the heat transfer tubes. The mandrel apparatus has mandrels which are inserted from the one axial direction end section side of the heat transfer tubes to the inside of the heat transfer tubes. Then, here, the grasping sections fix the heat transfer tubes so as not to move in the axial direction and the heat transfer fins and the heat transfer tubes are fixed by the heat transfer tubes expanding with the mandrels being inserted inside the heat transfer tubes in a state where the moving section is in the first state.

Here, tube expansion with the mandrels is performed in a state which is the first state where the moving section covers the surroundings of the grasping sections as described above. For this reason, the outer surfaces of the heat transfer tubes abut with the inner surfaces of the grasping sections and the outer surfaces of the grasping sections abut with the inner surfaces of the moving section. That is, there is a state where the moving section overlaps with the grasping sections which grasp the one end sections of the heat transfer tubes when the grasping sections fix the heat transfer tubes so as not to move in the axial direction. Due to this, here, variation in the force with which the heat transfer tubes are grasped by the grasping sections is suppressed and it is possible to perform precise tube expansion compared to fixing of the heat transfer tubes using the tube abutting members and the guide cylinders in the background art. In addition, here, it is possible to shorten the axial direction length of portions, which are grasped by the grasping sections out of the one axial direction end sections of the heat transfer tubes, since it is possible for the force with which the heat transfer tubes are grasped by the grasping sections to be larger and it is possible to also contribute to increased compactness of a heat exchanger compared to fixing of the heat transfer tubes using the tube abutting members and the guide cylinders in the background art. Moreover, here, it is possible to also apply to a case where the intervals between the heat transfer tubes are narrow since it is possible for the moving section to switch to the first state of covering the surroundings of the grasping sections only by moving in the axial direction of the heat transfer tubes. Furthermore, here, different to tube expansion which accompanies a guide cylinder moving process in the background art, it is possible to smoothly perform tube expansion since it is possible to perform a tube expansion process as a single process while fixing the heat transfer tubes so as not to move in the axial direction.

A heat transfer tube expansion apparatus according to a second aspect is the heat transfer tube expansion apparatus according to the first aspect where there is one or more of the moving sections and each of the moving sections corresponds to two or more of the grasping sections.

In fixing of the heat transfer tubes using the tube abutting members and the guide cylinders in the background art, even though moving of the guide cylinders which number as many as the number of the heat transfer tubes is necessary, here, it is possible for fixing of the heat transfer tubes to be performed while the number of the moving sections which are switched to the first state is small. Due to this, it is possible to also cope with a case where the intervals between the heat transfer tubes are extremely narrow or a case where the intervals between the heat transfer tubes are an unequal pitch where the intervals are not equal which are cases where it is difficult to cope with in fixing of the heat transfer tubes using the tube abutting members and the guide cylinders in the background art and it is possible to perform tube expansion in heat exchangers with various specifications.

A heat transfer tube expansion apparatus according to a third aspect is the heat transfer tube expansion apparatus according to the first or second aspects where inner surfaces of the grasping sections are parallel to the axial direction of the heat transfer tubes when the moving section is in the first state.

Here, it is possible for the inner diameter of the grasping sections to be predetermined dimensions in a state where the moving section switches to the first state. Due to this, it is possible for the outer surfaces of the heat transfer tubes to reliably abut with the inner surfaces of the grasping sections during expansion of the heat transfer tubes.

A heat transfer tube expansion apparatus according to a fourth aspect is the heat transfer tube expansion apparatus according to the third aspect where the grasping sections are formed so as to be open with a radial formation in a state where the moving section is in the second state.

Here, it is possible for a state where the grasping sections fix the heat transfer tubes to be terminated by the moving section switching from the first state to the second state after the grasping sections fix the heat transfer tubes so as not to move in the axial direction and the heat transfer fins and the heat transfer tubes are fixed due to expansion of the heat transfer tubes. In addition, it is possible for a flare process to be performed on the one axial direction end sections of the heat transfer tubes by utilizing spaces between the inner surfaces of the grasping sections and the outer surfaces of the heat transfer tubes after terminating the state where the grasping sections fix the heat transfer tubes.

A heat transfer tube expansion apparatus according to a fifth aspect is the heat transfer tube expansion apparatus according to any of the first to fourth aspects where inner surfaces of the grasping sections are a smooth surface.

Here, it is possible for the thickness after tube expansion to be uniformly maintained at the one end sections of the heat transfer tubes which are grasped by the grasping sections.

A heat transfer tube expansion apparatus according to a sixth aspect is the heat transfer tube expansion apparatus according to any of the first to the fourth aspects where inner surfaces of the grasping sections are a surface with irregularities.

Here, it is possible to secure a tooling allowance in the thickness of the tube during tube expansion to be secured at the one end sections of the heat transfer tubes which are grasped by the grasping sections.

A heat transfer tube expansion apparatus according to a seventh aspect is the heat transfer tube expansion apparatus according to any of the first to the sixth aspects where tapering with a widening tip end is formed on the tip end side of the grasping sections.

Here, it is possible for the one end sections of the heat transfer tubes to be smoothly guided to the grasping sections when the grasping sections are arranged at the one end sections of the heat transfer tubes.

A heat transfer tube expansion apparatus according to an eighth aspect is the heat transfer tube expansion apparatus according to any of the first to the seventh aspects where tapering, which guides the moving section when the moving section switches from the second state to the first state, is formed in the outer surfaces on the base end side of the grasping sections.

Here, it is possible to smoothly perform an operation where the moving section switches from the second state to the first state.

A heat transfer tube expansion method according to a ninth aspect where, first, grasping sections are arranged at one axial direction end sections of a plurality of heat transfer tubes in a state where the heat transfer tubes are inserted in insertion holes in a plurality of heat transfer fins which are layered with spacing of a predetermined interval. Next, a moving section, which switches between a first state of covering the surroundings of the grasping sections and a second state of not covering the surroundings of the grasping sections by moving in the axial direction of the heat transfer tubes, is set from the second state to the first state. Then, the grasping sections fix the heat transfer tubes so as not to move in the axial direction and the heat transfer fins and the heat transfer tubes are fixed by the heat transfer tubes expanding with the mandrels being inserted from the one axial direction end section side of the heat transfer tubes to the inside of the heat transfer tubes.

Here, as described above, tube expansion with the mandrels is performed in a state which is the first state where the moving section covers the surroundings of the grasping sections. For this reason, the outer surfaces of the heat transfer tubes abut with the inner surfaces of the grasping sections and the outer surfaces of the grasping sections abut with the inner surfaces of the moving section. That is, there is a state where the moving section overlaps with the grasping sections which grasp the one end section of the heat transfer tubes when the grasping sections fix the heat transfer tubes so as not to move in the axial direction. Due to this, here, variation in the force with which the heat transfer tubes are grasped by the grasping sections is suppressed and it is possible to perform precise tube expansion compared to fixing of the heat transfer tubes using the tube abutting members and the guide cylinders in the background art. In addition, here, it is possible to shorten the axial direction length of portions, which are grasped by the grasping sections out of the one axial direction end sections of the heat transfer tubes, since it is possible for the force with which the heat transfer tubes are grasped by the grasping sections to be large and it is possible to also contribute to increased compactness of a heat exchanger compared to fixing of the heat transfer tubes using the tube abutting members and the guide cylinders in the background art. Moreover, here, it is possible to also apply to a case where the intervals between the heat transfer tubes are narrow since it is possible for the moving section to switch to the first state of covering the surroundings of the grasping sections only by moving in the axial direction of the heat transfer tubes. Furthermore, here, different to tube expansion which accompanies a guide cylinder moving process in the background art, it is possible to smoothly perform tube expansion since it is possible to fix the heat transfer tubes so as not to move in the axial direction and to perform a tube expansion process as a single process.

DESCRIPTION OF EMBODIMENTS

An embodiment of a heat transfer tube expansion apparatus and a heat transfer tube expansion method according to the present invention will he described below based on the diagrams. Here, specific examples of the heat transfer tube expansion apparatus and the heat transfer tube expansion method according to the present invention are not limited to the embodiment and modified examples described below and modifications are possible within a scope which does not depart from the gist of the invention.

(1) Overall Configuration of Heat Transfer Tube Expansion Apparatus

Figure 1:
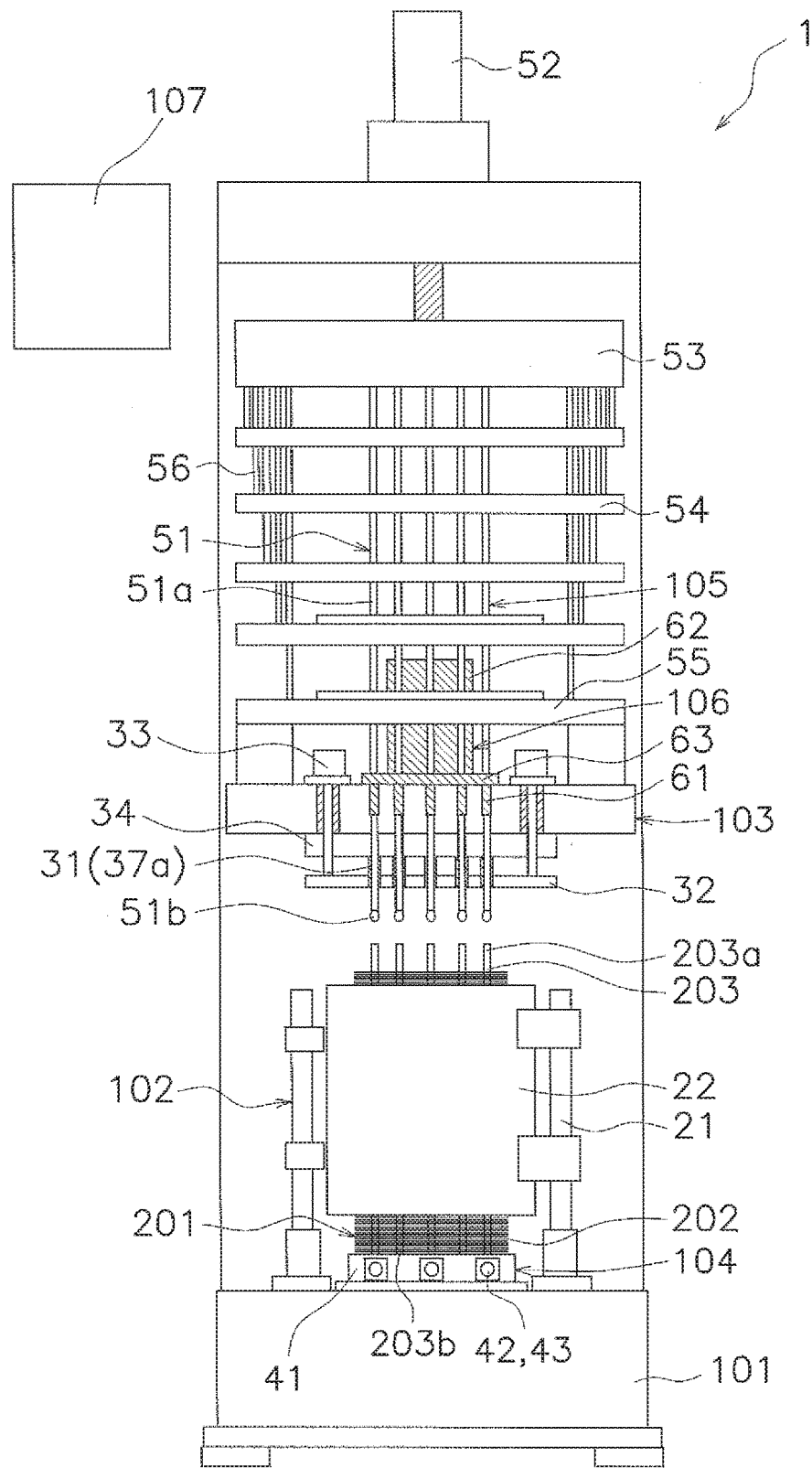
FIG. 1 is a schematic configuration diagram of a heat transfer tube expansion apparatus according to one embodiment of the present invention.

FIG. 1 is a schematic configuration diagram of a heat transfer tube expansion apparatus 1 according to one embodiment of the present invention.

The heat transfer tube expansion apparatus 1 is an apparatus for expansion of a plurality of heat transfer tubes 203 in a state of being inserted in insertion holes 202a in a plurality of heat transfer fins 202 (refer to FIG. 2) which are layered with spacing of a predetermined interval, that is, is an apparatus for expansion of the heat transfer tubes 203 which configure a heat exchanger 201 which is a fin and tube type of heat exchanger. The heat transfer tube expansion apparatus 1 here mainly has a base 101, a work clamp apparatus 102, heat transfer tube clamp apparatuses 103 and 104, a mandrel apparatus 105, a flare apparatus 106, and a control apparatus 107.

The base 101 is a platform where each type out of the apparatuses 102 to 106 and the like are provided.

The work clamp apparatus 102 is an apparatus which holds the heat exchanger 201 in a state where the axial center of the heat transfer tubes 203 is toward a predetermined direction (here, the up and down direction). The work clamp apparatus 102 mainly has a guide post 21 and a work receiver 22. The guide post 21 is a member which is arranged on both sides of the heat exchanger 201 and which extends along the axial direction of the heat transfer tubes 203 (here, the up and down direction). The work receiver 22 is a member which holds the heat exchanger 201 around its periphery and is supported by the guide post 21.

A first heat transfer tube clamp apparatus 103 which is the heat transfer tube fixing apparatus is an apparatus for fixing one axial direction end sections 203a (here, upper end sections) of the heat transfer tubes 203 so as not to move in the axial direction. The first heat transfer tube clamp apparatus 103 is arranged on the one axial direction end sections 203a side (here, the upper side) of the heat transfer tubes 203 with regard to the work receiver 22. Here, a detailed configuration of the first heat transfer tube clamp apparatus 103 will be described later.

A second heat transfer tube clamp apparatus 104 is an apparatus for fixing other axial direction end sections 203b (here, lower end sections) of the heat transfer tubes 203 so as not to move in the axial direction. The second heat transfer tube clamp apparatus 104 is arranged on the other axial direction end sections 203b side (here, the lower side) of the heat transfer tubes 203 with regard to the work clamp apparatus 102. The second heat transfer tube clamp apparatus 104 mainly has a receiver 41, a clamp pin 42, and a clamp pin cylinder 43 which is a second fixing drive apparatus. The receiver 41 is a member which receives the other axial direction end sections 203b of the heat transfer tubes 203 so as not to move in a direction so as to separate from the work receiver 22 (here, to the lower side). Here, recess sections, (which is not shown in the diagrams) which match up with the outer shape of the other axial direction end sections 203b of the heat transfer tubes 203, are formed in the receiver 41 in a case where the other axial direction end sections 203b of the heat transfer tubes 203 are formed with a U shape (which is not shown in the diagrams). Then, the other axial direction end sections 203b of the heat transfer tubes 203 are received using the recess sections in the receiver 41. The clamp pin 42 is a member which receives the other axial direction end sections 203b of the heat transfer tubes 203 so as not to move in a direction so as to be closer to the work receiver 22 (here, to the upper side). Here, the clamp pin 42 is a member with a column shape which receives the opposite side of the other axial direction end sections 203b of the heat transfer tubes 203 (here, the upper side) to the side with the recess sections in the receiver 41 in a case where the other axial direction end sections 203b of the heat transfer tubes 203 are formed with a U shape (which is not shown in the diagrams). The clamp pin cylinder 43 is a drive apparatus for moving the clamp pin 42 to a position to receive the other axial direction end sections 203b of the heat transfer tubes 203 and is arranged here in the vicinity of the receiver 41.

The mandrel apparatus 105 is an apparatus for expansion of the heat transfer tubes 203 from the one axial direction end section 203a side toward the other axial direction end sections 203b of the heat transfer tubes 203. The mandrel apparatus 105 is arranged on the one axial direction end section 203a side (here, the upper side) of the heat transfer tubes 203 with regard to the work receiver 22. The mandrel apparatus 105 mainly has mandrels 51 and a tube expansion servo motor 52 which is a tube expansion drive apparatus. The mandrels 51 are members which are inserted from one axial direction end section (here, upper end section) side of the heat transfer tubes 203 to the inside of the heat transfer tubes 203 and are provided to correspond to each of the plurality of heat transfer tubes 203. The mandrels 51 mainly have a mandrel rod 51a and a tube expansion head 51b. The mandrel rod 51a is a member with a long narrow rod shape such that it is possible to be inserted inside the heat transfer tubes 203 prior to tube expansion, one end section (here, an upper end section) of the mandrel rod 51a. is linked with a mandrel pressing frame 53, and the other end section (here, a lower end section) of the mandrel rod 51a extends toward the heat transfer tubes 203 (here, to the lower side). The tube expansion head 51b is a portion with an oval ball shape which is provided at the other end section (here, the lower end section) of the mandrel rod 51a. The tube expansion servo motor 52 is a drive mechanism for moving the mandrel pressing frame 53, which is linked with the plurality of mandrels 51, in the axial direction of the heat transfer tubes 203 and is arranged here on the upper side of the mandrel pressing frame 53. A plurality of intermediate plates 54 and a guide frame 55 are arranged on the heat transfer tube 203 side (here, the lower side) of the mandrel pressing frame 53. Through holes (which are not shown in the diagrams) which the mandrels 51 pass through are formed in the intermediate plates 54 and the guide frame 55 at positions which correspond to the plurality of mandrels 51. In addition, between the mandrel pressing frame 53 and the intermediate plates 54, between the intermediate plate 54 and the intermediate plate 54, and between the intermediate plates 54 and the guide frame 55 are linked by rods 56. Then, the plurality of mandrels 51 move together when the mandrel pressing frame 53 moves toward the heat transfer tubes 203 (here, to the lower side) due to the tube expansion servo motor 52 being driven. Due to this, expansion of the heat transfer tubes 203 from the one axial direction end section 203a (here, the upper end section) side toward the other axial direction end sections 203b (here, the lower end sections) in the heat transfer tubes 203 with the tube expansion heads 51b being inserted inside the heat transfer tubes 203. At this time, the intermediate plates 54 move along with moving of the mandrel pressing frame 53 and reach the guide frame 55.

The flare apparatus 106 is an apparatus for performing a flare process on the one axial direction end sections 203a of the heat transfer tubes 203 after tube expansion. The fare apparatus 106 is arranged on the one axial direction end section 203a side (here, the upper side) of the heat transfer tubes 203 with regard to the work receiver 22. The flare apparatus 106 mainly has flare jigs 61 and a flare process servo motor 62 which is a flaring drive apparatus. The flare jigs 61 are members for tube expansion with substantially a taper shape by being inserted into the one axial direction end sections 203a of the heat transfer tubes 203 and are provided to correspond to each of the plurality of heat transfer tubes 203. The flare jig 61 is a cylindrical member which is formed with a central hole where it is possible for the mandrel rod 51a to pass through, one end section (here, an upper end section) of the flare jig 61 is linked with a flare pressing frame 63, and the other end section (here, a lower end section) of the flare jig 61 is a portion which has an outer surface with substantially a taper shape. The flare process servo motor 62 is a drive mechanism for moving the flare pressing frame 63 which is linked with a plurality of the flare jigs 61 in the axial direction of the heat transfer tubes 203 and is arranged here on the upper side of the flare pressing frame 53. Then, the plurality of flare jigs 61 move together when the flare pressing frame 63 moves toward the heat transfer tubes 203 (here, to the lower side) after tube expansion due to the flare process servo motor 62 being driven. Due to this, the flare process on the one axial direction end sections 203a of the heat transfer tubes 203 with the portions, which have the outer surface with substantially a taper shape, of the flare jigs 61 being inserted inside the one axial direction end sections 203a of the heat transfer tubes 203 after tube expansion.

The control apparatus 107 is an apparatus for performing operations for controlling each type out of the apparatuses 102 to 106 and is provided on the base 101 or at a location which is separated from the heat transfer tube expansion apparatus 1. Then, the operation of the heat transfer tube expansion apparatus 1 which will be described later is performed using the control apparatus 107.

(2) Detailed Configuration of Heat Transfer Tube Fixing Apparatus and Operations of Heat Transfer Tube Expansion Apparatus The detailed configuration of the first heat transfer tube clamp apparatus 103 which is the heat transfer tube fixing apparatus and operations of the heat transfer tube expansion apparatus 1 will be described next using FIG. 1 to FIG. 15. Here, FIG. 2, FIG. 6 to FIGS. 8, and 11 to FIG. 15 are diagrams illustrating operations of the heat transfer tube expansion apparatus 1. FIG. 3 to FIG. 5, FIG. 9, and FIG. 10 are diagrams illustrating a collet chuck 31 which configures the first heat transfer tube clamp apparatus 103.

-Detailed Configuration of First Heat Transfer Tube Clamp Apparatus 103-

The detailed configuration of the first heat transfer tube clamp apparatus 103 which is the heat transfer tube fixing apparatus will be described. The first heat transfer tube clamp apparatus 103 mainly has a plurality of collet chucks 31 which have a grasping section 37a, a collet opening and closing slide plate 32 which is a moving section, and a collet opening and closing cylinder 33 which is a moving section drive apparatus.

The collet chucks 31 are members for grasping the one axial direction end sections 203a of the heat transfer tubes 203 during expansion of the heat transfer tubes 203 and are provided to correspond to each of the plurality of heat transfer tubes 203. The collet chuck 31 is a cylindrical member, one end section (here, an upper end section) of the collet chuck 31 is a fixing section 35 which is linked with a clamp main body 34, and the other end section (here, a lower end section) of the collet chuck 31 is a radial section 37 where a plurality of (here, four) slits 36 are formed with a radial formation and which is open with a radial formation so that its diameter expands by spaces which are the slits 36 become larger heading further away from the fixing section 35 toward the other axial direction end section 203b side of the heat transfer section 203 (here, heading toward the lower side). The grasping sections 37a, which grasp the one axial direction end section 203a of the plurality of heat transfer tubes 203 in a state where the heat transfer tubes 203 are inserted in the insertion holes 202a in the plurality of heat transfer fins 202 which are layered with spacing of a predetermined interval, are formed in the radial sections 37. In addition, it is possible for the clamp main body 34 to be moved in the axial direction of the heat transfer tubes 203 (here, in the up and down direction) using a clamp main body drive apparatus (which is not shown in the diagrams) which is formed from a drive apparatus such as a cylinder or a servo motor. For this reason, the plurality of collet chucks 31 and the collet opening and closing slide plate 32 move together in the axial direction of the heat transfer tubes 203 (here, in the up and down direction when the clamp main body 34 moves in the axial direction of the heat transfer tubes 203 (here, in the up and down direction).

The collet opening and closing slide plate 32 is a member with a plate shape which is arranged on the heat transfer tube 203 side (here, on the lower side) of the clamp main body 34 and is formed with guide holes 32a, where the mandrels 51 and the one axial direction end sections 203a of the heat transfer tubes 203 pass through, at positions which correspond to each of the one axial direction end sections 203a of the plurality of heat transfer tubes 203. The collet opening and closing slide plate 32 is linked with regard to the clamp main body 34, which is fixed to the plurality of collet chucks 31, so as to be able to move in the axial direction of the heat transfer tubes 203. Then, it is possible to switch between a first state of coveting the surroundings of the grasping sections 37a of the collet chucks 31 and a second state of not covering the surroundings of the grasping sections 37a of the collet chucks 31 by moving of the collet opening and closing slide plate 32 in the axial direction of the heat transfer tubes 203. The first state is a state where the collet opening and closing slide plate 32 moves (here, falls) to a position where the inner surfaces of the guide holes 32a cover the surroundings of the grasping sections 37a by being moved so as to separate with regard to the clamp main body 34 to the other axial direction end section 203b side (here, the lower side) of the heat transfer tubes 203. The second state is a state where the collet opening and closing slide plate 32 moves (here, rises) to a position where the inner surfaces of the guide holes 32a do not cover the surroundings of the grasping sections 37a by moving to be closer with regard to the clamp main body 34 to the one axial direction end section 203a side (here, the upper side) of the heat transfer tubes 203.

Here, in a case where the collet opening and closing slide plate 32 is in the second state, the spaces which are the slits 36 in the collet chucks 31 become larger as described above since the inner surfaces of the guide holes 32a does not cover the surroundings of the grasping sections 37a and the radial sections 37, that is, the grasping sections 37a, of the collet chucks 31 are in a state of being open with a radial formation. At this time, radial connecting sections 37b, which are more to the fixing section 35 side (here, the upper side) than the grasping section 37a in the radial sections 37, pass through the guide holes 32a in the collet opening and closing slide plate 32, but the guide holes 32a in the collet opening and closing slide plate 32 are positioned so that the grasping sections 37a does not pass through.

On the other hand, in a case where the collet opening and closing slide plate 32 is in the first state, the spaces which are the slits 36 in the collet chucks 31 become smaller since the inner surfaces of the guide holes 32a cover the surroundings of the grasping sections 37a and the radial sections 37, that is, the grasping sections 37a, of the collet chucks 31 are in a state of being closed. At this time, the guide holes 32a in the collet opening and closing slide plate 32 reach positions of covering the surroundings of the grasping sections 37a on the other axial direction end section 203b side of the heat transfer tubes 203 due to the radial connecting sections 37b of the radial sections 37 passing through the guide holes 32a in the collet opening and closing slide plate 32. Here, the collet opening and closing slide plate 32 covers across all of the surroundings of the grasping sections 37a in the axial direction. Here, in a state where the radial sections 37 of the collet chucks 31 are closed, there is a state where the inner surfaces of the grasping sections 37a are parallel to the axial direction of the heat transfer tubes 203 when the collet opening and closing slide plate 32 is set from the second state to the first state. Here, by the surroundings of the grasping sections 37a, which have an outer diameter d2 which is larger than an inner diameter d1 of the guide holes 32a due to being open with a radial formation, being covered due to being inserted into the guide holes 32a in the collet opening and closing slide plate 32, the outer diameter d2 of the grasping sections 37a shrinks to the inner diameter d1 of the guide holes 32a. At this time, the grasping sections 37a are in a state of being cylindrical with outer surfaces which are parallel with the axial direction of the heat transfer tubes 203 and the spaces which are the slits 36 in the collet chucks 31 are substantially zero. In addition, since the guide holes 32a also have inner surfaces which are parallel with the axial direction of the heat transfer tubes 203, the entirety of the outer surfaces of the grasping sections 37a are in a state of abutting with the inner surfaces of the guide holes 32a. In addition, in a case where the collet opening and closing slide plate 32 is in the first state, clamp holes 37c, which are for grasping the one axial direction end sections 203a of the heat transfer tubes 203, are formed inside the grasping sections 37a. Then, an inner diameter d3 of the clamp holes 37c becomes larger than the outer diameter of the one axial direction end sections 203a of the heat transfer tubes 203 before tube expansion so that it is possible for the one axial direction end sections 203a of the heat transfer tubes 203 to pass through the inner diameter d3 of the clamp holes 37c. Moreover, the inner diameter d3 of the clamp holes 37c becomes slightly smaller than the outer diameter of the one axial direction end sections 203a of the heat transfer tubes 203 after tube expansion so that it is possible to fix the one axial direction end sections 203a of the heat transfer tubes 203 so as not to move in the axial direction during tube expansion. Here, the inner surfaces of the grasping sections 37a are a smooth surface. In addition, first guide sections 37d, which have an inner surface with tapering with a widening tip end, are formed at the tip end side (here, the lower end side) of the grasping sections 37a.

In addition, the radial connecting sections 37b which are formed in the radial sections 37 along with the grasping sections 37a are portions with a thickness which is smaller than the grasping sections 37a. Second guide sections 37e, which have an outer surface with tapering which widens from the outer surface of the radial connecting section 37b toward the outer surface of the grasping section 37a, are formed between the radial connecting sections 37b and the grasping sections 37a in the axial direction, that is, on the base end side of the grasping sections 37a.

The collet opening and closing cylinder 33 is a drive mechanism for moving the collet opening and closing slide plate 32 in the axial direction of the heat transfer tubes 203 and is arranged here on the upper side of the clamp main body 34. Then, the grasping sections 37a of the plurality of collet chucks 31 are set from a state of being open with a radial formation to a state of being closed when the collet opening and closing slide plate 32 moves (here, falls) from the second state to the first state due to moving of the collet opening and closing cylinder 33. In addition, the grasping sections 37a of the plurality of collet chucks 31 are set from a state of being closed to a state of being open with a radial formation when the collet opening and closing slide plate 32 moves (here, rises) from the first state to the second state due to moving of the collet opening and closing cylinder 33. Here, the grasping sections 37a of the plurality of collet chucks 31 are opened and closed together when switching between the states of the collet opening and closing cylinder 33 since the one collet opening and closing slide plate 32 corresponds to the grasping sections 37a of the plurality of collet chucks 31.

-Operations of Heat Transfer Tube Expansion Apparatus-

The operations of the heat transfer tube expansion apparatus I will be described.

Figure 2:
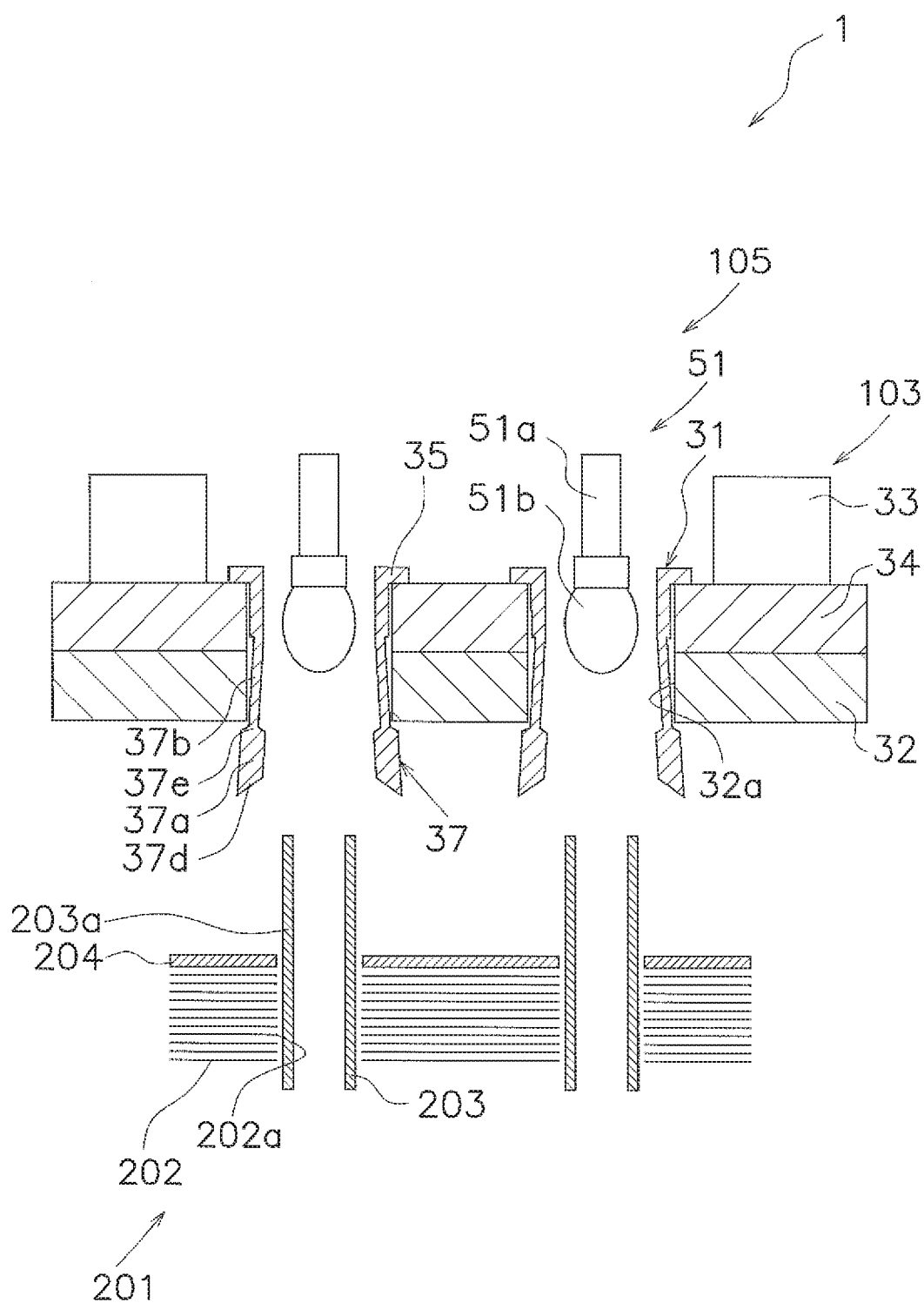
FIG. 2 is a diagram illustrating operations of the heat transfer tube expansion apparatus (in a state where a heat exchanger is set in the heat transfer tube expansion apparatus).
Figure 3:
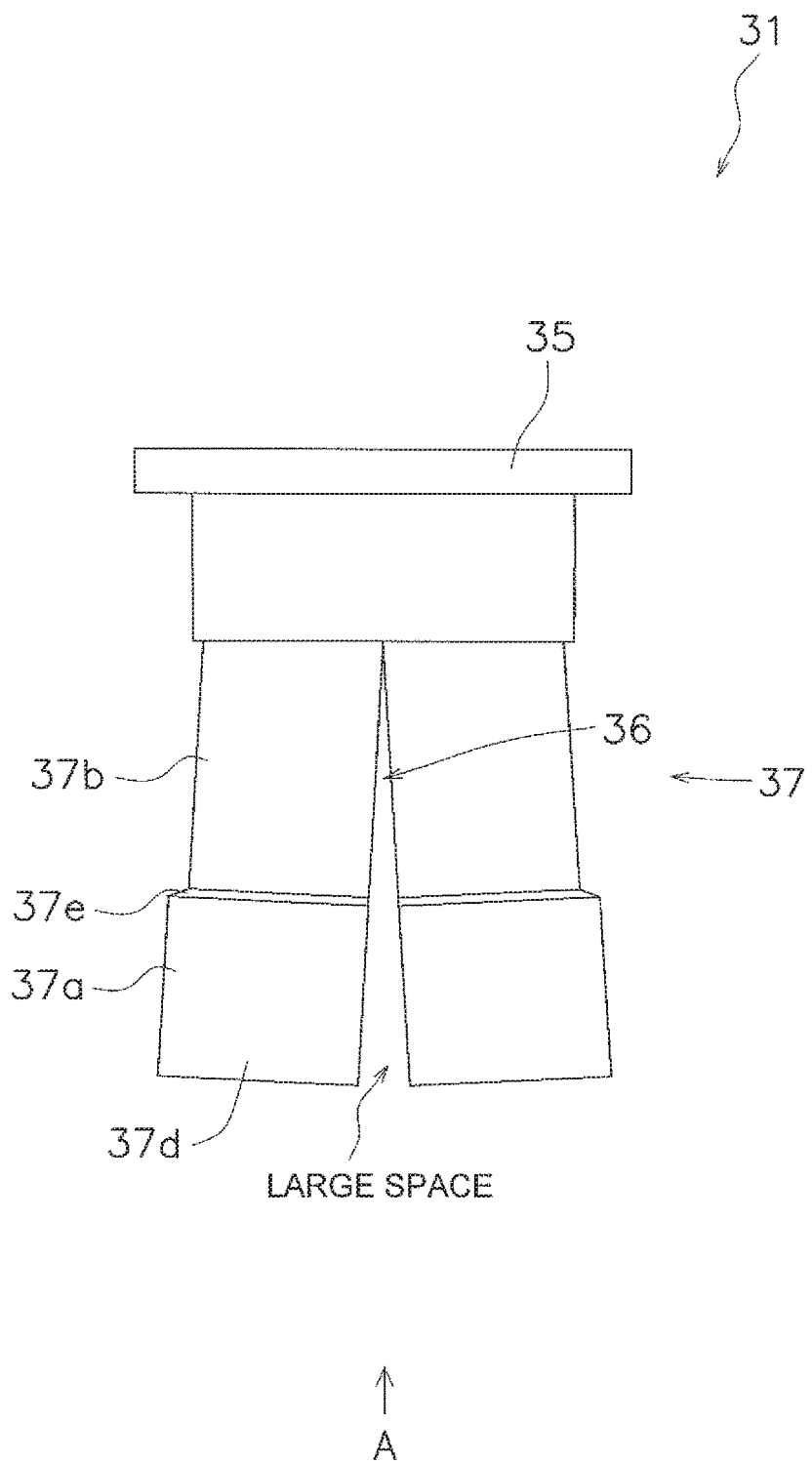
FIG. 3 is a diagram of the outer appearance of a collet chuck (in a state where a grasping section is open).
Figure 4:
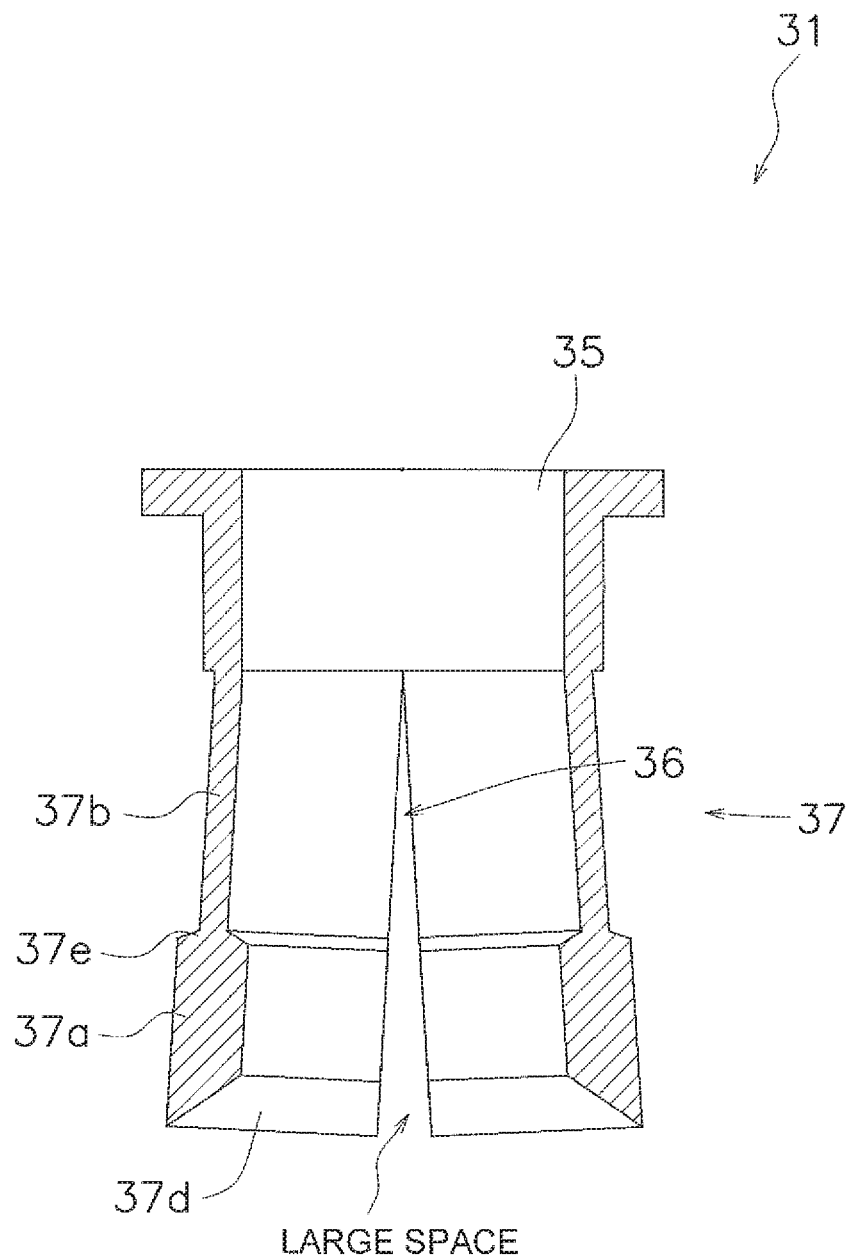
FIG. 4 is across sectional diagram of the collet chuck (in a state where the grasping section is open).
Figure 5:
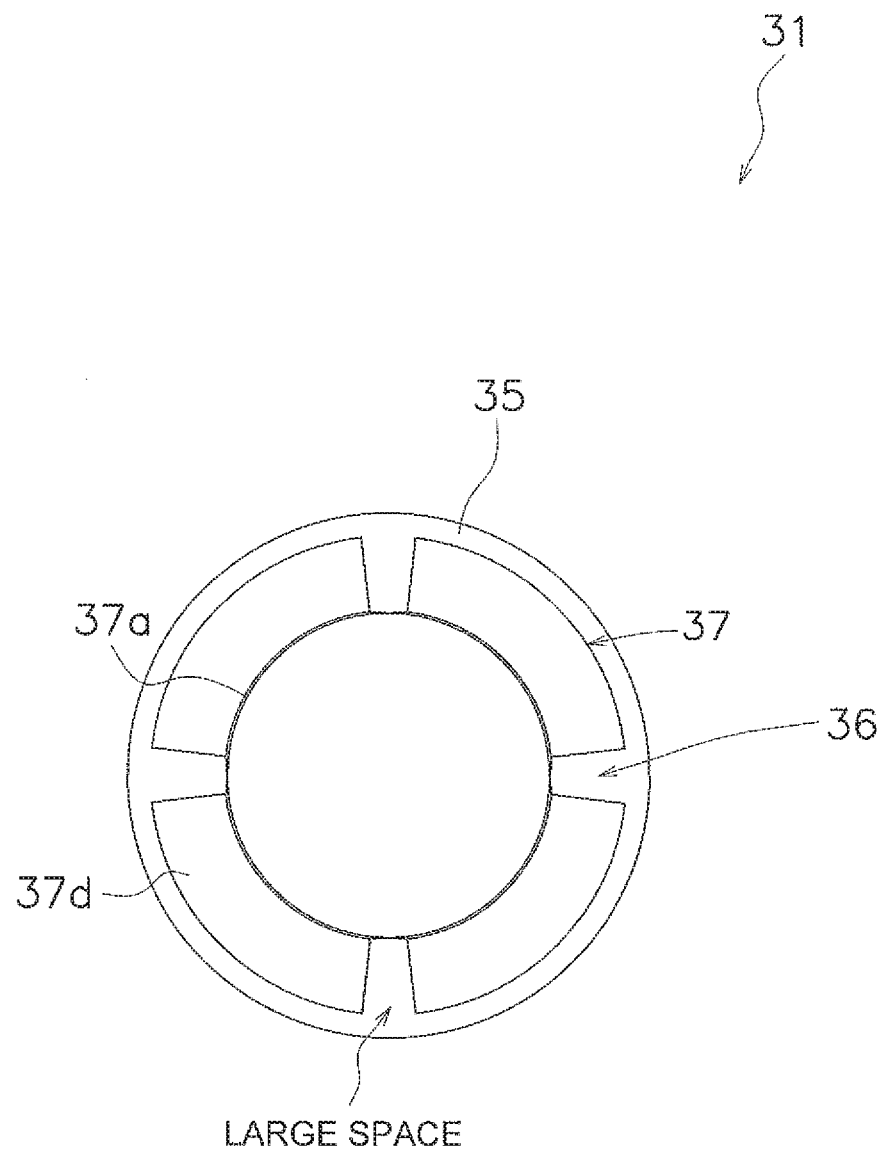
FIG. 5 is a diagram of a view from an arrow A in FIG. 3.

First, the heat exchanger 201, which is temporary setup in a state as shown in FIG. 2 where the plurality of heat transfer tubes 203 are inserted in the insertion holes 202a in the plurality of heat transfer fins 202 which are layered with spacing of a predetermined interval, is set in the heat transfer tube expansion apparatus 1. Here, the heat exchanger 201 is held by the work clamp apparatus 102 in a state where the axial center of the heat transfer tubes 203 is toward a predetermined direction (here, the up and down direction). In addition, the heat exchanger 201 is fixed so that the other axial direction end sections 203b (here, the lower end sections) of the heat transfer tubes 203 do not move in the axial direction due to the second heat transfer tube clamp apparatus 104 (refer to FIG. 1).

At this time, the clamp main body 34 of the first heat transfer tube clamp apparatus 103 is in a position (here, the upper side) which is separated from the one axial direction end sections 203a of the heat transfer tubes 203. For this reason, the grasping sections 37a of the collet chucks 31 are not in positions of being inserted around the outside of the one axial direction end sections 203a of the heat transfer tubes 203 (here, positions which are more to the upper side than the one axial direction end sections 203a of the heat transfer tubes 203). In addition, the grasping section 37a of the collet chuck 31 is in a state of being open with a radial formation due to the collet opening and closing slide plate 32 since the collet opening and closing slide plate 32 of the first heat transfer tube clamp apparatus 103 is in the second state.

Figure 6:
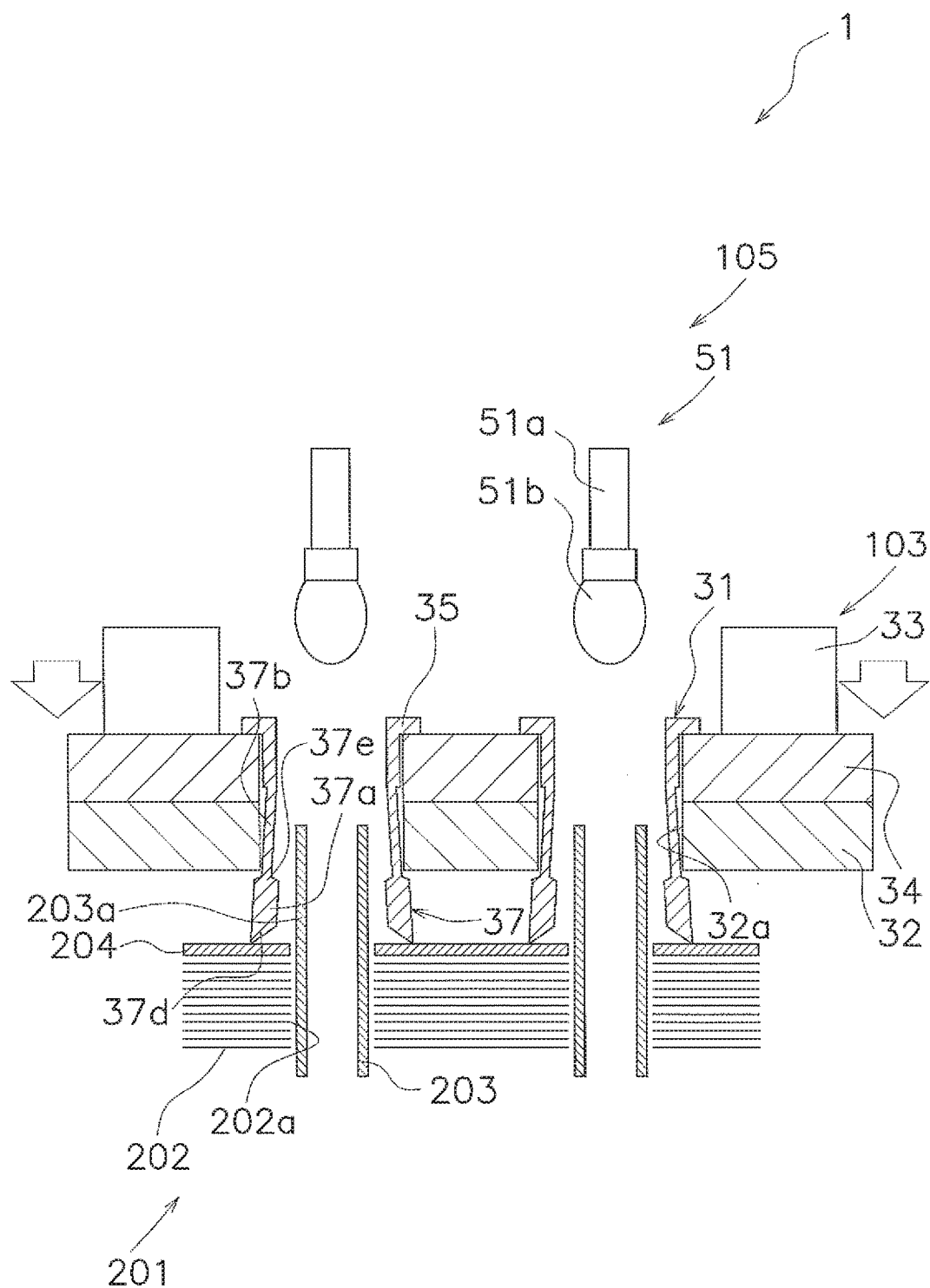
FIG. 6 is a diagram illustrating operations of the heat transfer tube expansion apparatus (in a state where one axial direction end section of a heat transfer tube is inserted inside of the collet chuck).

Next, the clamp main body 34 of the first heat transfer tube clamp apparatus 103 moves in a direction (here, to the lower side) to be closer to the one axial direction end sections 203a of the heat transfer tubes 203 as shown in FIG. 6. Due to this, the grasping sections 37a of the collet chucks 31 are arranged at positions of being inserted around the outside of the one axial direction end sections 203a of the heat transfer tubes 203.

At this time, the one axial direction end sections 203a of the heat transfer tubes 203 are smoothly guided to the insides of the grasping sections 37a using the inner surfaces with tapering in the first guide sections 37d which are formed on the tip end side (here, the lower end side) of the grasping sections 37a.

In addition, here, the clamp main body 34 moves to a position where the tip ends of the collet chucks 31 (here, lower ends of the first guide sections 37d of the collet chucks 31) abuts with a tube plate 204 of the heat exchanger 201. Due to this, the length of insertion around the outside of the one axial direction end sections 203a of the heat transfer tubes 203 with regard to the collet chuck 31, that is, the valid length of the heat exchanger 201, is determined.

Figure 7:
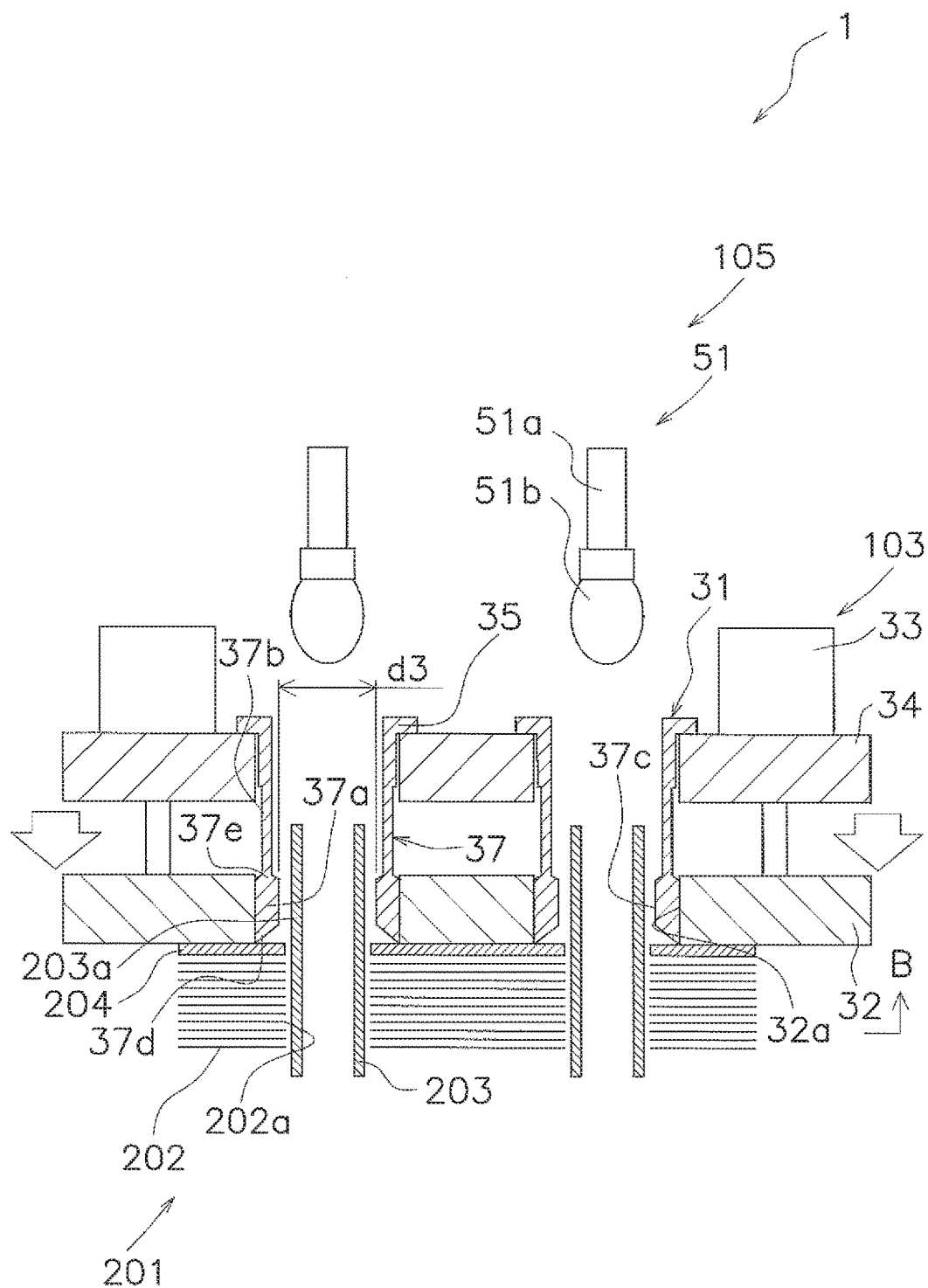
FIG. 7 is a diagram illustrating operations of the heat transfer tube expansion apparatus (in a state where the grasping section of the collet chuck is closed by switching a collet opening and closing slide plate to a first state).
Figure 8:
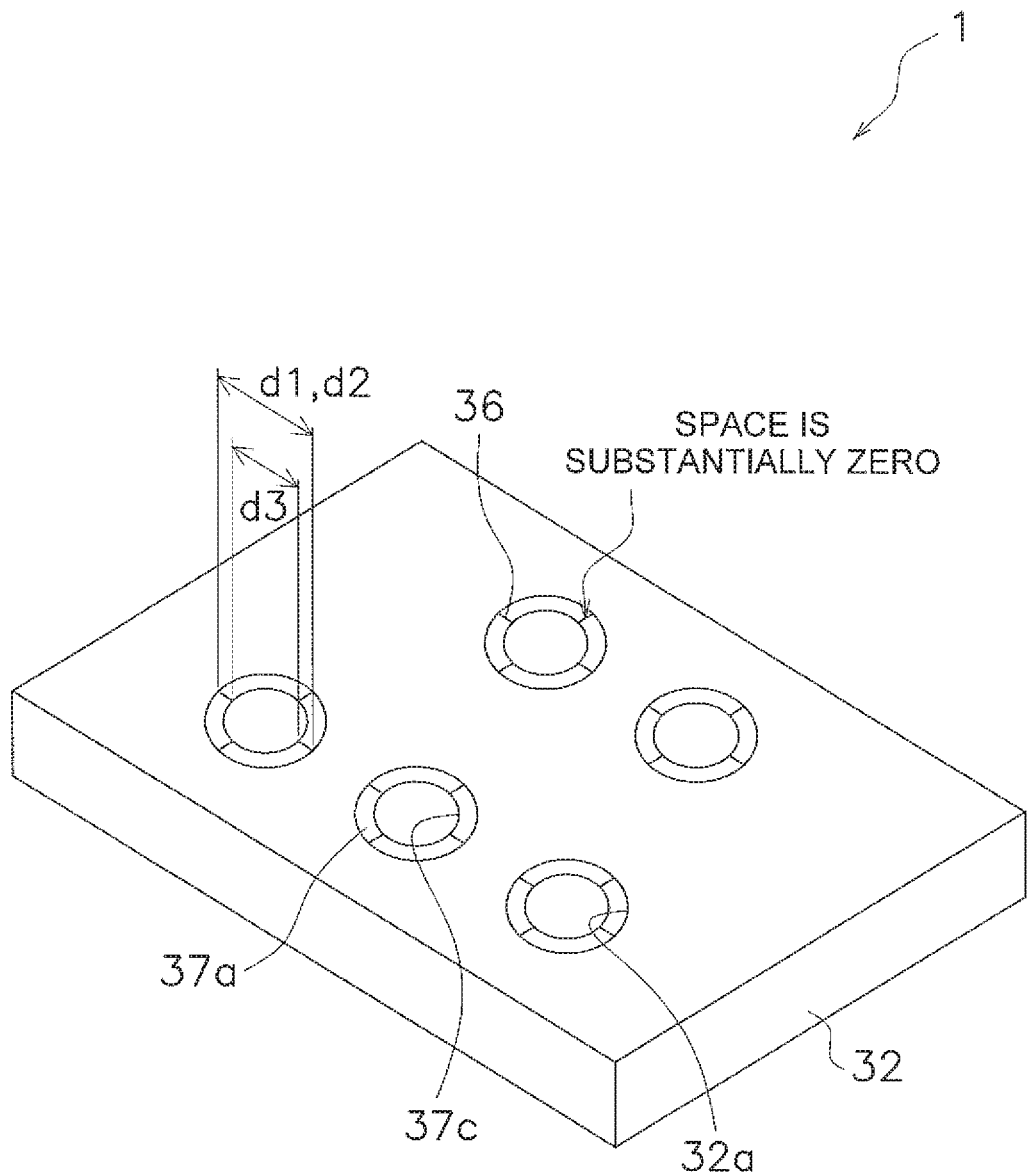
FIG. 8 is a diagram of a view from an arrow B in FIG. 7 (only the grasping section and the collet opening and closing slide plate).
Figure 9:
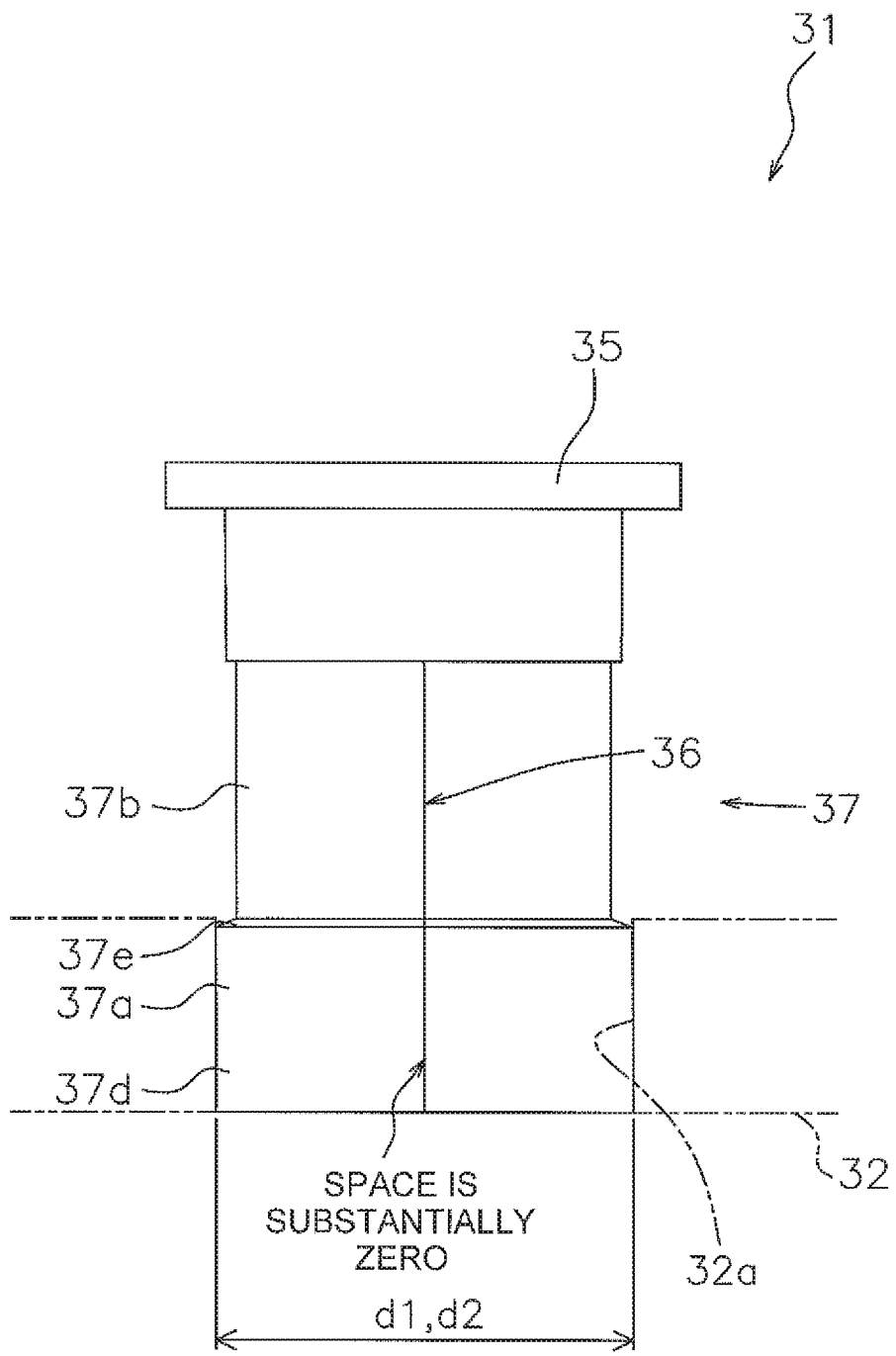
FIG. 9 is a diagram of the outer appearance of the collet chuck (in a state where the grasping section is closed).
Figure 10:
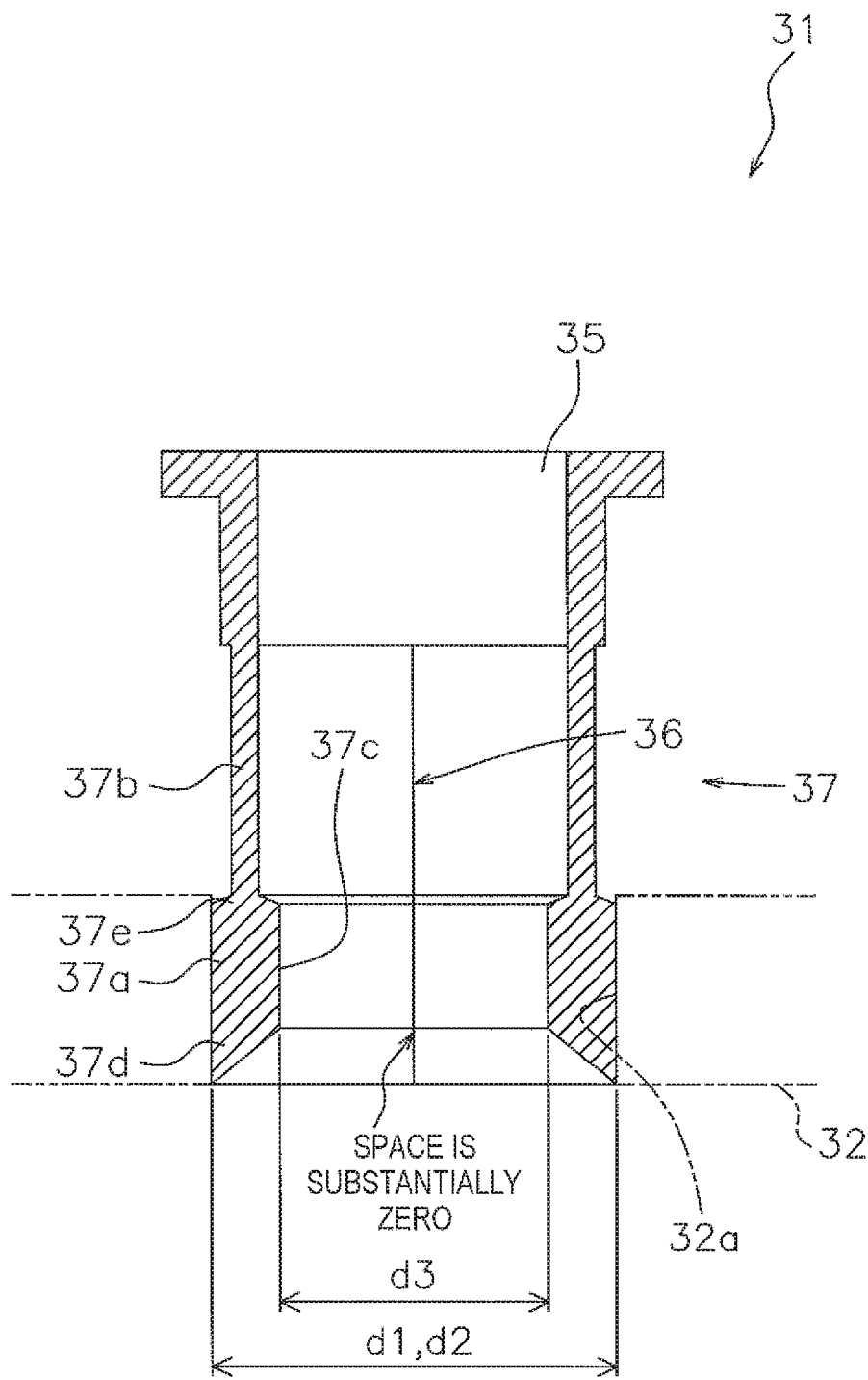
FIG. 10 is a cross sectional diagram of the collet chuck (in a state where the grasping section is closed).

Next, there is a state where the grasping sections 37a of the collet chucks 31 are closed by switching the collet opening and closing slide plate 32 of the first heat transfer tube clamp apparatus 103 to the first state as shown in FIG. 7 and FIG. 8. Due to this, the collet opening and closing slide plate 32 covers the surroundings of the grasping sections 37a and the inner diameter d3 of the clamp holes 37c in the grasping sections 37a become a size where it is possible to fix the one axial direction end section 203a of the heat transfer tube 203 during tube expansion so as not to move in the axial direction.

At this time, the collet opening and closing slide plate 32 is smoothly guided from the second state to the first state using the outer surfaces with tapering in the second guide sections 37e which are formed between the radial connecting sections 37b and the grasping sections 37a in the axial direction, that is, on the base end side of the grasping sections 37a.

Figure 11:
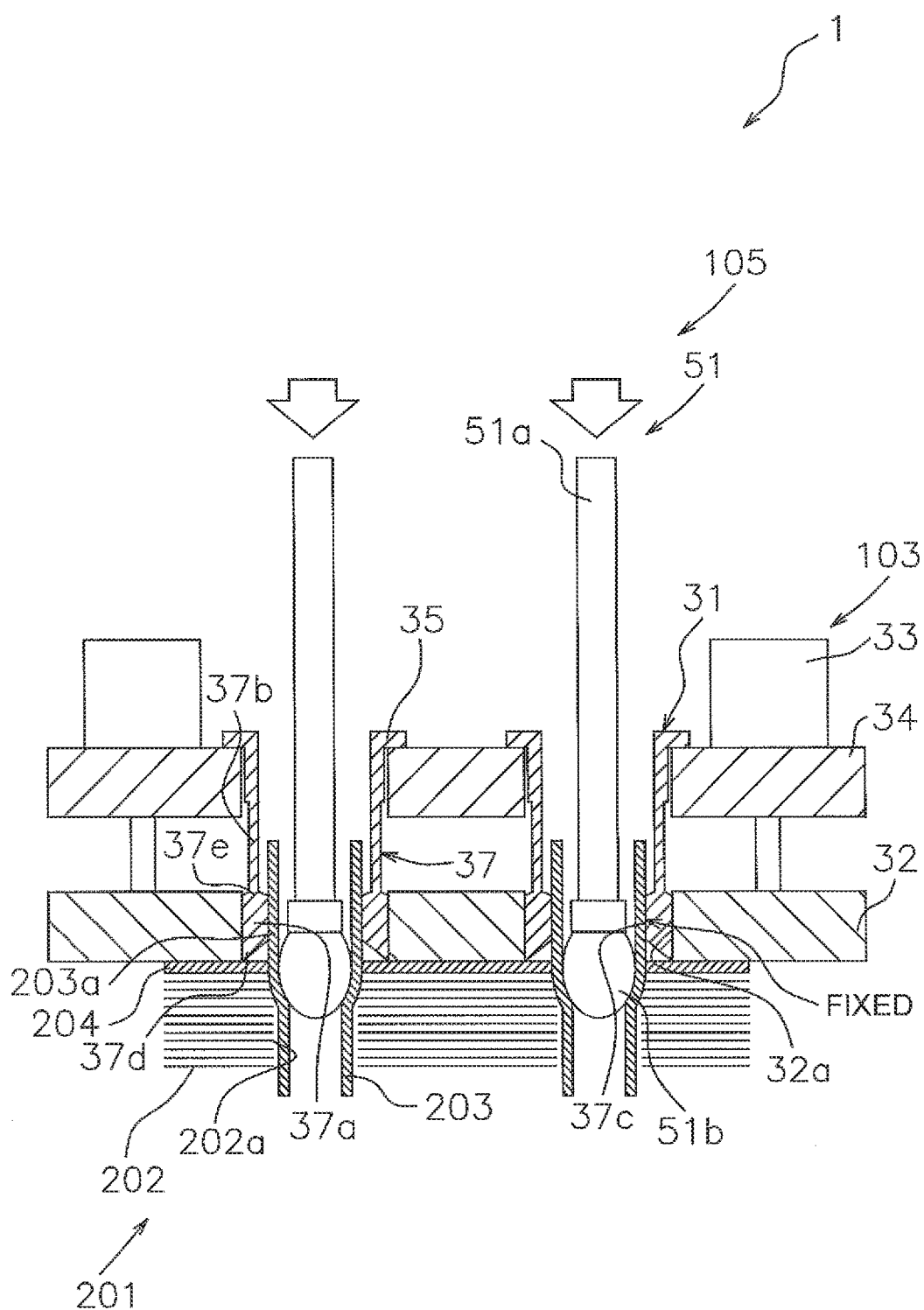
FIG. 11 is a diagram illustrating operations of the heat transfer tube expansion apparatus (in a state of tube expansion is carried out to one axial direction end section of the heat transfer tube).
Figure 12:
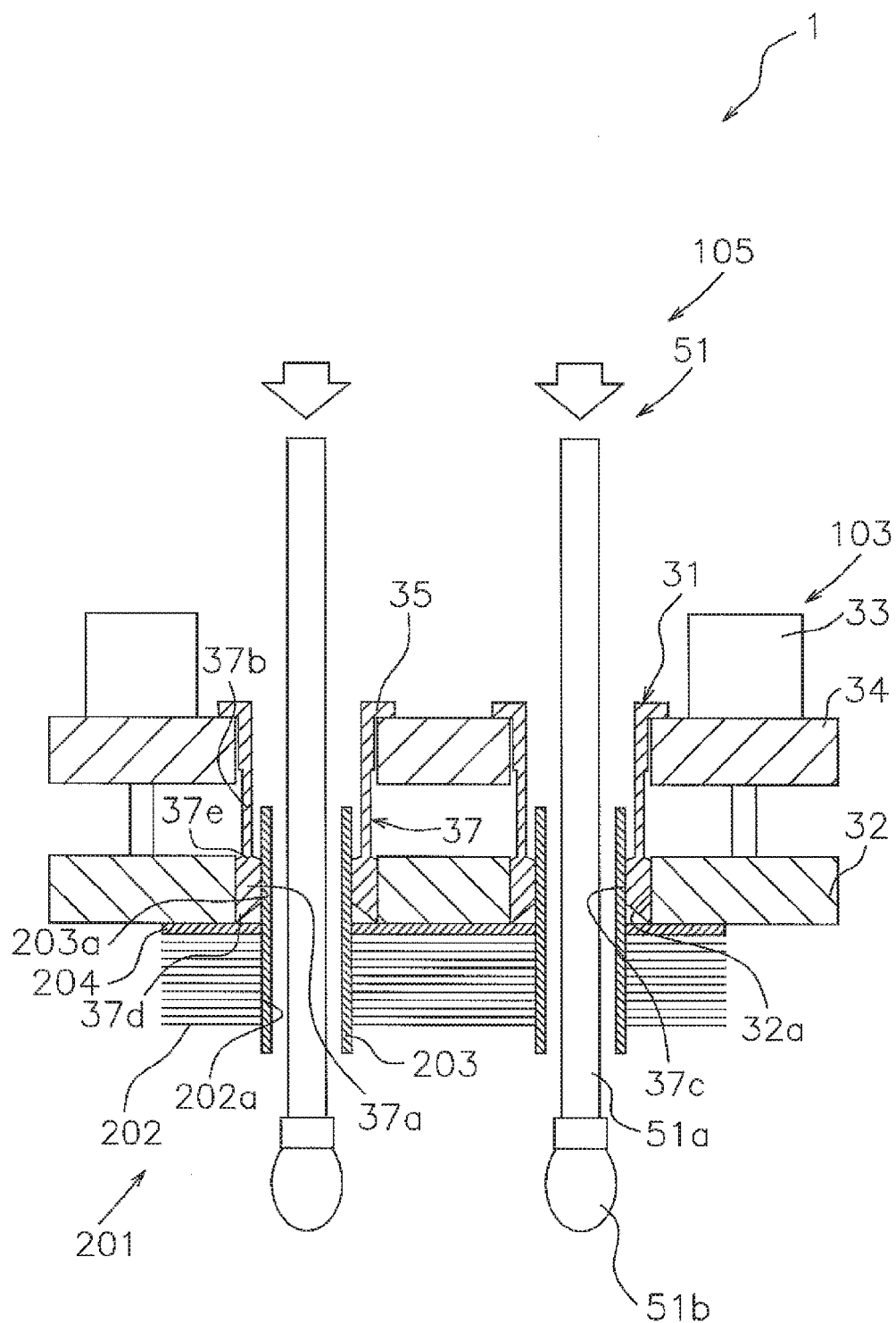
FIG. 12 is a diagram illustrating operations of the heat transfer tube expansion apparatus (in a state of tube expansion is carried out to the other axial direction end section of the heat transfer tube).

Next, expansion of the heat transfer tube 203 from the one axial direction end section 203a (here, the upper end section) toward the other axial direction end section 203b (here, the lower end section) of the heat transfer tube 203 is performed with the tube expansion heads 5 1b being inserted inside the heat transfer tubes 203 by the mandrels 51 of the mandrel apparatus 105 moving toward the heat transfer tubes 203 (here, toward the lower side) as shown in FIG. 11 and FIG. 12. Due to this, the grasping sections 37a fix the heat transfer tubes 203 so as not to move in the axial direction and the heat transfer fins 202 and the heat transfer tubes 203 are fixed.

At this time, the outer diameter of the tube at the one axial direction end sections 203a of the heat transfer tubes 203 become larger during tube expansion to the one axial direction end section 203a of the heat transfer tube 203 as shown in FIG. 11 and the heat transfer tubes 203 are pushed against and fit together with the inner surfaces of the grasping sections 37a of the collet chucks 31. Due to this, it is possible to fasten the one axial direction end sections 203a of the heat transfer tubes 203 with the inner surfaces of the grasping sections 37a and to fix the heat transfer tubes 203 so as not to move in the axial direction. Then, after this, it is possible for tube expansion to be continuously performed toward the other axial direction end sections 203b of the heat transfer tubes 203 as shown in FIG. 12 in a state where both axial direction ends of the heat transfer tube 203 being fixed so as not to move in the axial direction.

Figure 13:
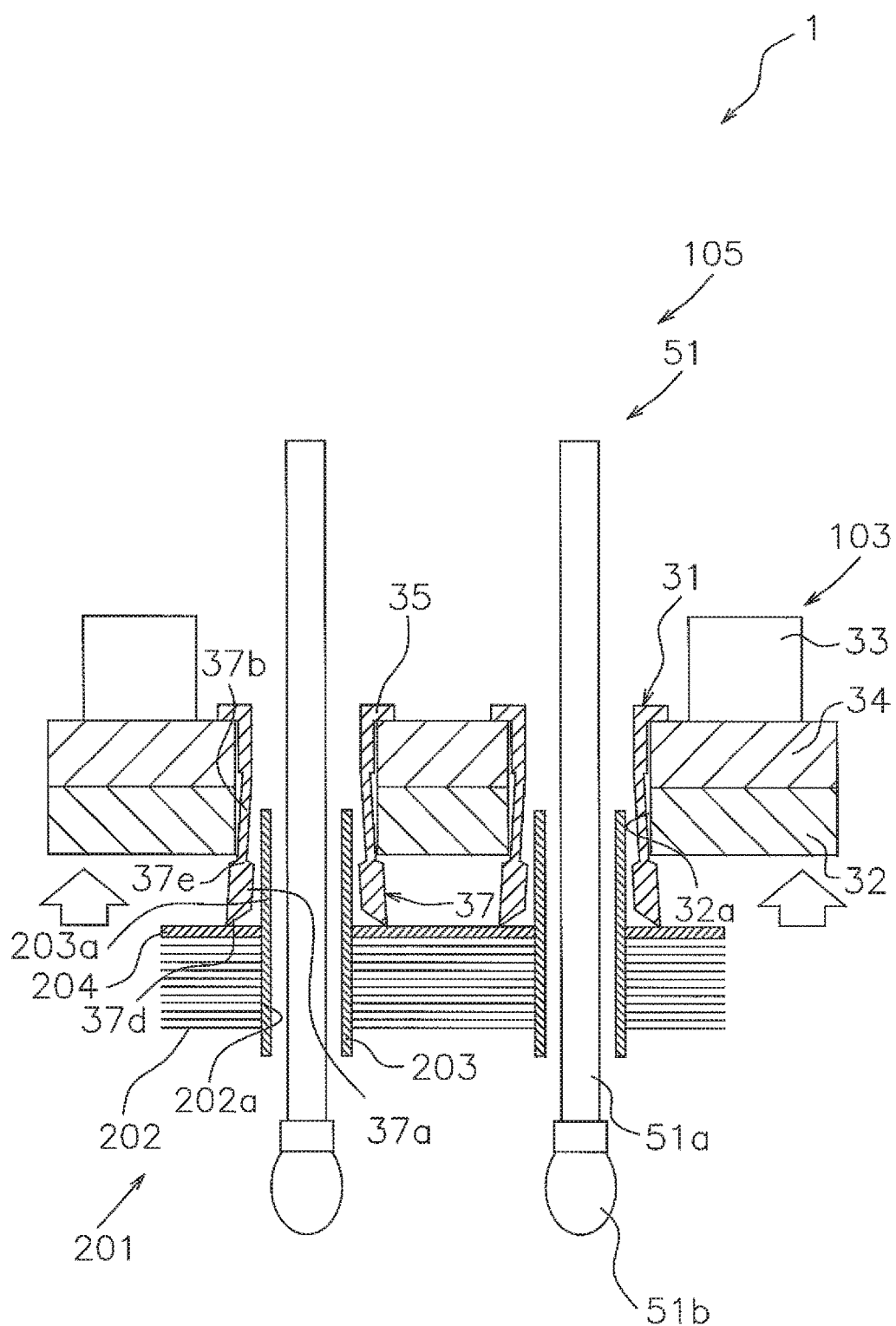
FIG. 13 is a diagram illustrating operations of the heat transfer tube expansion apparatus (in a state where the grasping section of the collet chuck is opened by moving a guide plate in the axial direction of a heat transfer tube after expansion of the heat transfer tube).

Next, there is a state where the grasping sections 37a of the collet chucks 31 are open with a radial formation by switching the collet opening and closing slide plate 32 of the first heat transfer tube clamp apparatus 103 to the second state as shown in FIG. 13. Due to this, fixing of the one axial direction end sections 203a (here, the upper end section) of the heat transfer tubes 203 is released.

At this time, the collet opening and closing slide plate 32 is smoothly guided from the first state to the second state using the outer surfaces with tapering in the second guide sections 37e which are formed between the radial connecting sections 37b and the grasping sections 37a in the axial direction, that is, on the base end side of the grasping sections 37a.

Figure 14:
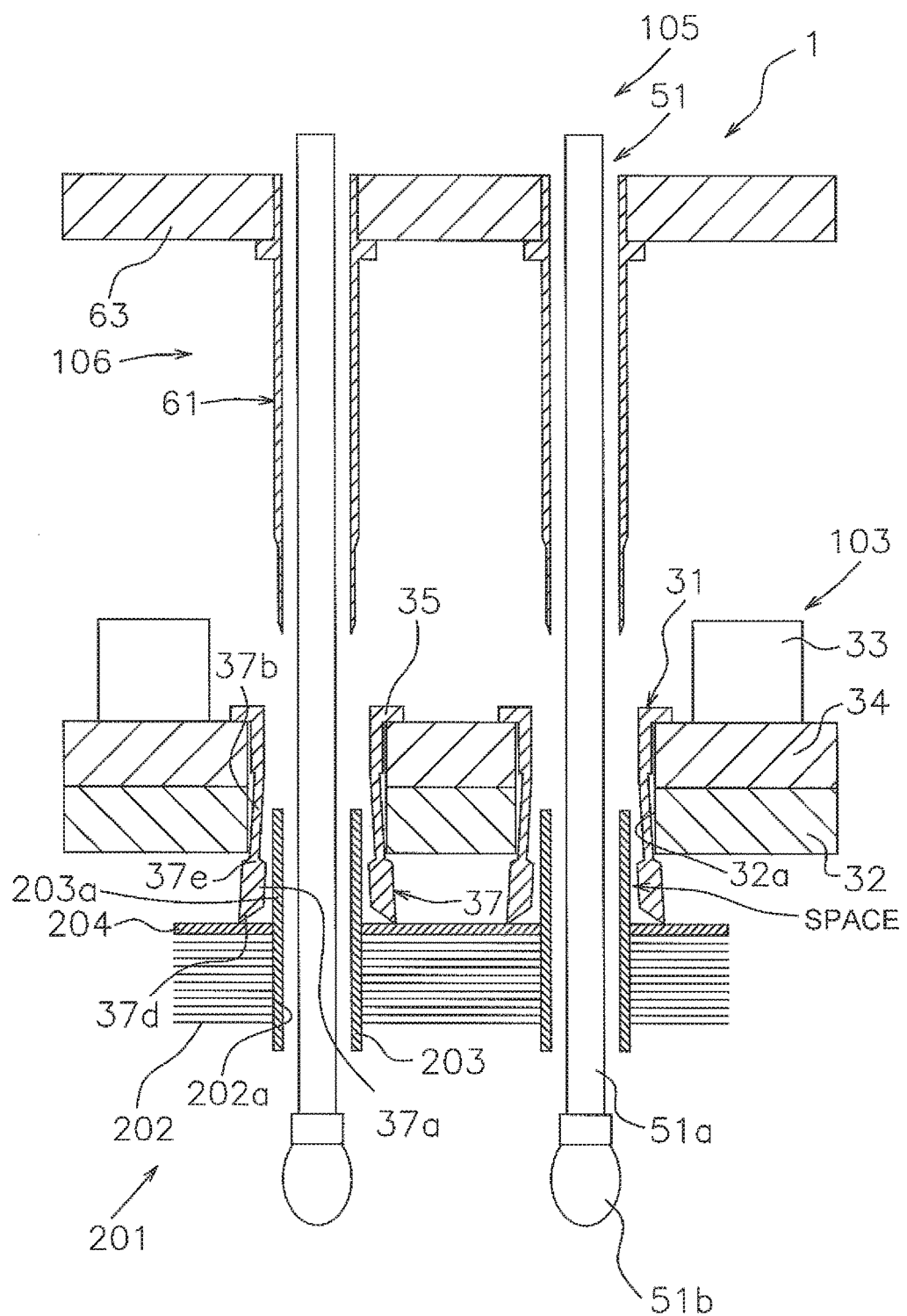
FIG. 14 is a diagram illustrating operations of the heat transfer tube expansion apparatus (in a state immediately before starting a flare process on one axial direction end section of the heat transfer tube after expansion of the heat transfer tube).
Figure 15:
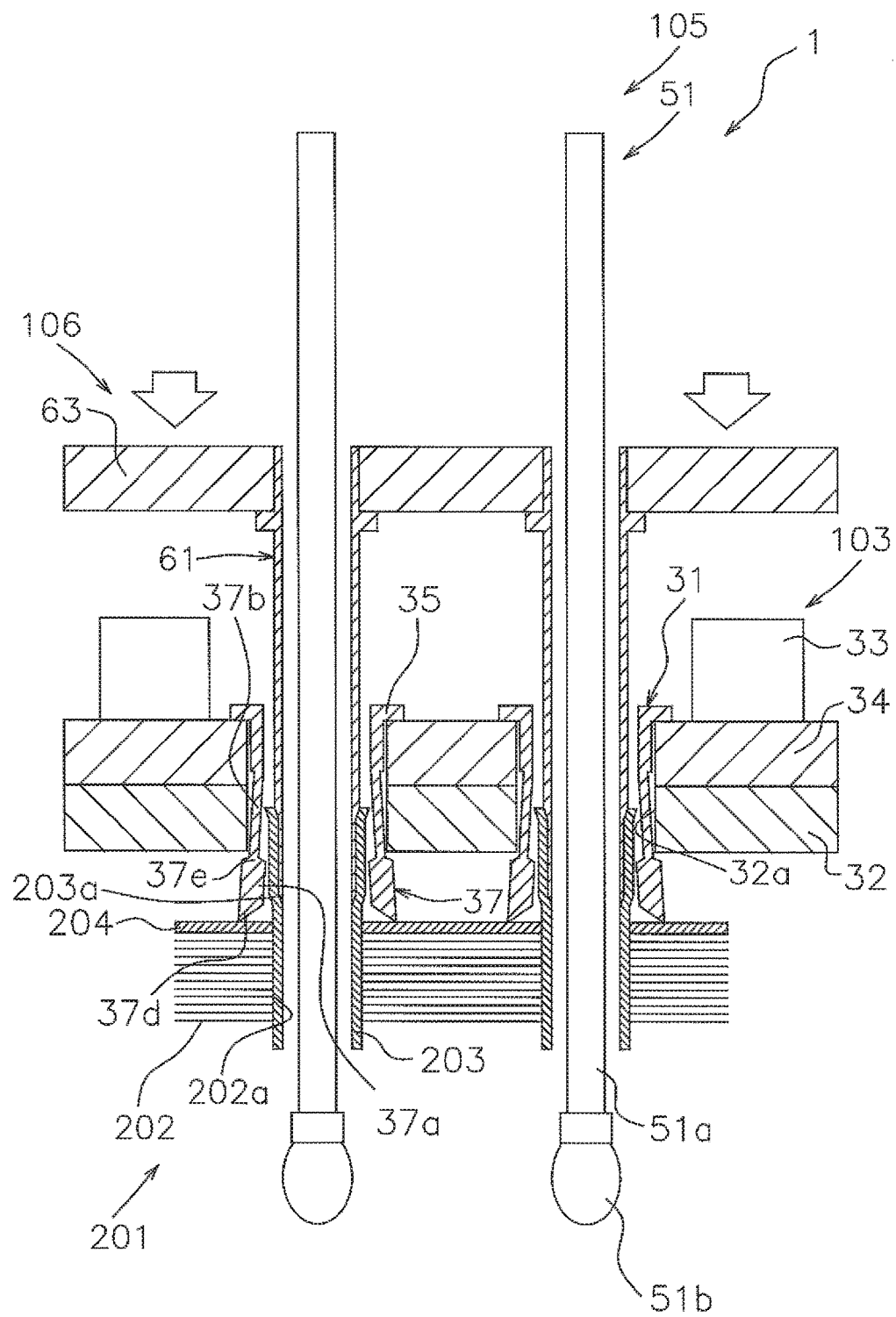
FIG. 15 is a diagram illustrating operations of the heat transfer tube expansion apparatus (in a state where the flare process is performed on one axial direction end section of the heat transfer tube).

Next, a flare process is performed on the one axial direction end sections 203a of the heat transfer tubes 203 by the flare jigs 61 of the flare apparatus 106 moving toward the one axial direction end sections 203a of the heat transfer tubes 203 (here, toward the lower side) as shown in FIG. 14 and FIG. 15.

At this time, spaces between the radial sections 37 of the collet chucks 31 and the one axial direction end sections 203a of the heat transfer tubes 203 after tube expansion are secured due to the operation described above where the grasping sections 37a of the collet chucks 31 are open with a radial formation. Due to this, it is possible to perform a flare process on the heat transfer tubes 203 in a state where the grasping sections 37a of the collet chucks 31 remain inserted around the outside of the one axial direction end sections 203a of the heat transfer tubes 203. Moreover, it is possible to perform a flare process on portions, which are fixed so as not to move in the axial direction by the grasping sections 37a of the collet chucks 31, out of the one axial direction end sections 203a of the heat transfer tubes 203.

(3) Characteristics of Heat Transfer Tube Expansion apparatus and Heat Transfer Tube Expansion method The heat transfer tube expansion apparatus 1 and the heat transfer tube expansion method according to the present embodiment have the following characteristics.

<A>

Here, tube expansion with the mandrels 51 is performed in a state which is the first state where the collet opening and closing slide plate 32 which is the moving section covers the surroundings of the grasping sections 37a of the collet chucks 31 as described above. For this reason, the outer surfaces of the heat transfer tubes 203 abut with the inner surfaces of the grasping sections 37a and the outer surfaces of the grasping sections 37a consequently abut with the inner surfaces of the collet opening and closing slide plate 32. That is, there is a state where the collet opening and closing slide plate 32 overlaps with the grasping sections 37a which grasp the one end sections 203a of the heat transfer tubes 203 when the grasping sections 37a fix the heat transfer tubes 203 so as not to move in the axial direction. Due to this, here, variation in the force with which the heat transfer tubes 203 are grasped by the grasping sections 37a is suppressed and it is possible to perform precise tube expansion compared to fixing of the heat transfer tube using the tube abutting members and the guide cylinders in the background art. In addition, here, it is possible for the force with which the heat transfer tubes 203 are grasped by the grasping sections 37a to be large compared to fixing of the heat transfer tubes using the tube abutting members and the guide cylinders in the background art. For this reason, it is possible to shorten the axial direction length of portions which are grasped by the grasping sections 37a out of the one axial direction end sections 203a of the heat transfer tubes 203 and it is consequently possible to shorten the axial direction length of the one axial direction end sections 203a of the heat transfer tubes 203. Then, due to this, it is possible to also contribute to increased compactness of the heat exchange 201. Moreover, here, it is possible to also apply to a case where the intervals between the heat transfer tubes 203 are narrow since it is possible for the collet opening and closing slide plate 32 to switch to the first state of covering the surroundings of the grasping sections 37a only by moving in the axial direction of the heat transfer tubes 203. Furthermore, here, different to tube expansion which accompanies a guide cylinder moving process in the background art, it is possible to smoothly perform tube expansion since it is possible to fix the heat transfer tubes 203 so as not to move in the axial direction and to perform a tube expansion process as a single process.

<B>

In addition, in fixing of the heat transfer tubes using the tube abutting members and the guide cylinders in the background art, moving of the guide cylinders which number as many as the number of the heat transfer tubes is necessary. In contrast to this, here, there is the one collet opening and closing slide plate 32 which is the moving section and the collet opening and closing slide plate 32 corresponds to all of the grasping sections 37a of the plurality of collet chucks 31 as described above. Due to this, it is possible for fixing of the heat transfer tubes 203 to be performed using all of the plurality of grasping sections 37a only by switching the one collet opening and closing slide plate 32 to the first state, Due to this, it is possible to also cope with a case where the intervals between the heat transfer tubes 203 are extremely narrow or a case where the intervals between the heat transfer tubes 203 are an unequal pitch where the intervals are not equal which are cases where it is difficult to cope with in fixing of the heat transfer tubes using the tube abutting members and the guide cylinders in the background art and it is possible to perform tube expansion in the heat exchanger 201 with various specifications.

Here, there is only the one collet opening and closing slide plate 32, but the number of the collet opening and closing slide plates 32 is not limited to this. Although not shown in the diagrams, there may be a configuration where, for example, there are two or more of the collet opening and closing slide plates 32 and the grasping sections 37a of the plurality of collet chucks 31 corresponds with regard to each of the collet opening and closing slide plates 32. Even in this case, it is possible to perform fixing of the heat transfer tubes 203 while the number of the collet opening and closing slide plates 32 which are switched to the first state is small.

<C>

In addition, here, the inner surfaces of the grasping sections 37a of the collet chucks 31 are parallel to the axial direction of the heat transfer tubes 203 when the collet opening and closing slide plate 32 which is the moving section is in the first state as described above. Due to this, it is possible for the inner diameter d3 of the grasping sections 37a to be predetermined dimensions, that is, to be dimensions which are larger than the outer diameter of the one axial direction end sections 203a of the heat transfer tubes 203 before tube expansion and slightly smaller than the outer diameter of the one axial direction end sections 203a of the heat transfer tubes 203 after tube expansion in a state where the collet opening and closing slide plate 32 switches to the first state. Due to this, it is possible for the outer surfaces of the heat transfer tubes 203 to reliably abut with the inner surfaces of the grasping sections 37a during expansion of the heat transfer tubes 203.

<D>

In addition, here, the grasping sections 37a of the collet chucks 31 are formed so as to be open with a radial formation in a state where the collet opening and closing slide plate 32 which is the moving section is in the second state as described above. Due to this, it is possible for a state where the grasping sections 37a fix the heat transfer tubes 203 to be terminated by the collet opening and closing slide plate 32 switching from the first state to the second state after the grasping sections 37a fix the heat transfer tubes 203 so as not to move in the axial direction and the heat transfer fins 202 and the heat transfer tubes 203 are fixed due to expansion of the heat transfer tube 203. In addition, it is possible for a flare process to be performed on the one axial direction end sections 203a of the heat transfer tubes 203 by utilizing spaces between the inner surfaces of the grasping sections 37a and the outer surfaces of the heat transfer tubes 203 after terminating the state where the grasping sections 37a fix the heat transfer tubes 203.

<E>

In addition, here, the inner surfaces of the grasping sections 37a of the collet chucks 31 are a smooth surface as described above. Due to this, it is possible for the thickness after tube expansion to be uniformly maintained at the one end sections 203a of the heat transfer tubes 203 which are grasped by the grasping sections 37a.

<F>

In addition, here, tapering with a widening tip end (here, the inner surface with tapering in the first guide section 37d) is formed on the tip end side of the grasping sections 37a of the collet chucks 31 as described above. Due to this, it is possible for the one end sections 203a of the heat transfer tubes 203 to be smoothly guided to the grasping sections 37a when the grasping sections 37a are arranged at the one end sections 203a of the heat transfer tubes 203.

<G>

In addition, here, tapering (here, outer surface with tapering in the second guide section 37e), which guides the collet opening and closing slide plate 32 which is the moving section when the collet opening and closing slide plate 32 switches from the second state to the first state, is formed in the outer surfaces on the base end side of the grasping sections 37a of the collet chucks 31 as described above. Due to this, it is possible to smoothly perform an operation where the collet opening and closing slide plate 32 switches from the second state to the first state.

(4) Modified Examples

<A>

Figure 16:
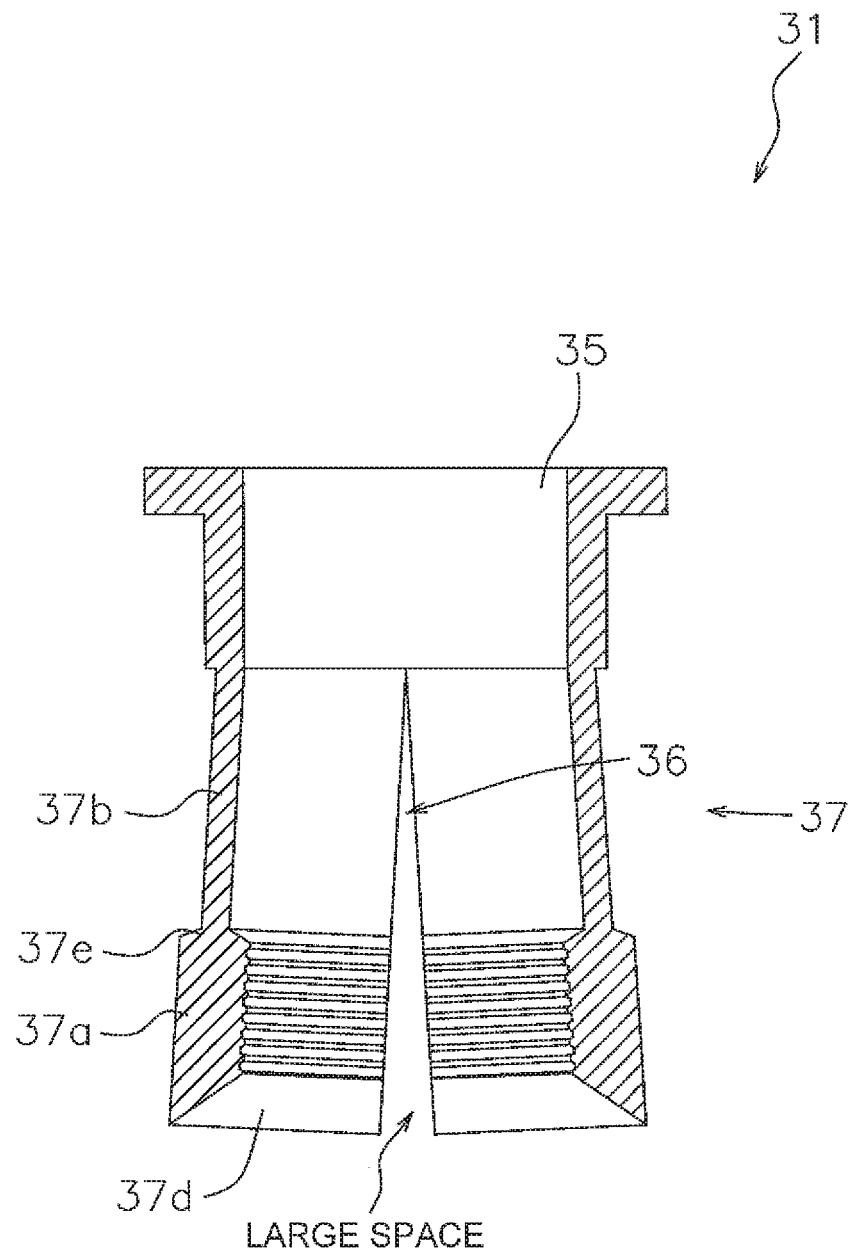
FIG. 16 is a cross sectional diagram of a collet chuck according to a modified example (in a state where a grasping section is open).

The inner surfaces of the grasping sections 37a of the collet chucks 31 are a smooth surface in the heat transfer tube expansion apparatus 1 of the embodiment described above (refer to FIG. 4), but the inner surfaces of the grasping sections 37a of the collet chucks 31 may be, for example, a surface with irregularities as shown in FIG. 16. In this case, it is possible to secure a tooling allowance in the thickness of the tube during tube expansion at the one end sections 203a of the heat transfer tubes 203 which are grasped by the grasping sections 37a.

<B>

In addition, the drive apparatuses for the various types of apparatuses are a servo motor or cylinder in the heat transfer tube expansion apparatus 1 of the embodiment described above, but the drive apparatuses for the various types of apparatuses are not limited to this.

<C>

In addition, there is a vertical configuration where the axial direction of the heat transfer tubes 203 is orientated in the up and down direction (refer to FIG. 1) in the heat transfer tube expansion apparatus 1 of the embodiment described above, but the axial direction of the heat transfer tubes 203 is not limited to this and there may be a horizontal configuration where the axial direction of the heat transfer tubes 203 is orientated in the horizontal direction.

<D>

In addition, there is a configuration with not only the apparatuses 102 to 105 for tube expansion but also the flare apparatus 106 for performing a flare process (refer to FIG. 1, FIG. 14, and FIG. 15) in the heat transfer tube expansion apparatus 1 of the embodiment described above, but the configuration is not limited to this and there may only be the apparatuses 102 to 105 for tube expansion.

INDUSTRIAL APPLICABILITY

The present invention is able to be widely applied with regard to a heat transfer tube expansion apparatus and a heat transfer tube expansion method where a plurality of heat transfer tubes expand in a state of being inserted in insertion holes in a plurality of heat transfer fins which are layered with spacing of a predetermined interval.

What is claimed is:

1. A heat transfer tube expansion apparatus comprising:
a heat transfer tube fixing apparatus which has grasping sections which grasp one axial direction end sections of a plurality of heat transfer tubes in a state in which the heat transfer tubes are inserted in insertion holes in a plurality of heat transfer fins which are layered with spacing of a predetermined interval and a moving section which switches between a first state of covering surroundings of the grasping sections and a second state of not covering the surroundings of the grasping sections by moving in an axial direction of the heat transfer tubes; and
a mandrel apparatus which has mandrels which are inserted from the one axial direction end section side of the heat transfer tubes to an inside of the heat transfer tubes,
the moving section being a plate shaped member in which guide holes are formed,
the first state being a state in which inner surfaces of the guide holes are moved to positions covering the surroundings of the grasping sections and the second state being a state in which the inner surfaces of the guide holes are moved to positions not covering the surroundings of the grasping sections,
the grasping sections fixing the heat transfer tubes so as not to move in the axial direction and the heat transfer fins and the heat transfer tubes are fixed by the heat transfer tubes expanding with the mandrels being inserted inside the heat transfer tubes in a state when the moving section is in the first state, and
the guide holes extending from an upper surface to a lower surface of the plate shaped member of the moving section.

2. The heat transfer tube expansion apparatus according to claim 1, wherein
inner surfaces of the grasping sections are parallel to the axial direction of the heat transfer tubes when the moving section is in the first state.

3. The heat transfer tube expansion apparatus according to claim 2, wherein
the grasping sections are formed so as to be open with a radial formation when the moving section is in the second state.

4. The heat transfer tube expansion apparatus according to claim 1, wherein
there is at least one moving section, and
each moving section corresponds to two or more of the grasping sections.

5. The heat transfer tube expansion apparatus according to claim 1, wherein
inner surfaces of the grasping sections are smooth surfaces.

6. The heat transfer tube expansion apparatus according to claim 1, wherein
inner surfaces of the grasping sections are surfaces with irregularities.

7. The heat transfer tube expansion apparatus according to claim 1, wherein
tapering with a widening tip end is formed on the tip end side of the grasping sections.

8. The heat transfer tube expansion apparatus according to claim 1, wherein
tapering, which guides the moving section when the moving section switches from the second state to the first state, is formed in the outer surfaces on the base end side of the grasping sections.

* * * * *